(12) United States Patent
Toya et al.

(10) Patent No.: US 8,115,447 B2
(45) Date of Patent: Feb. 14, 2012

(54) BATTERY PACK WITH A SECONDARY COIL ELECTROMAGNETICALLY RECHARGEABLE BY MAGNETIC INDUCTION EFFECT

(75) Inventors: Shoichi Toya, Minamiawaji (JP); Yasushi Inoue, Sumoto (JP); Takuya Matsuda, Minamiawaji (JP)

(73) Assignee: Sanyo Electric Co., Ltd., Osaka (JP)

( * ) Notice: Subject to any disclaimer, the term of this patent is extended or adjusted under 35 U.S.C. 154(b) by 574 days.

(21) Appl. No.: 11/896,715

(22) Filed: Sep. 5, 2007

(65) Prior Publication Data

US 2008/0061735 A1    Mar. 13, 2008

(30) Foreign Application Priority Data

Sep. 7, 2006   (JP) ................... 2006-243331

(51) Int. Cl.
*H02J 7/00* (2006.01)
(52) U.S. Cl. .................. 320/108; 320/107; 320/112
(58) Field of Classification Search .................. 320/108; 336/232, DIG. 2
See application file for complete search history.

(56) References Cited

U.S. PATENT DOCUMENTS

| | | | | |
|---|---|---|---|---|
| 4,616,205 A | * | 10/1986 | Praught et al. ................... | 336/82 |
| 5,502,430 A | * | 3/1996 | Takahashi et al. ............. | 336/232 |
| 5,959,433 A | * | 9/1999 | Rohde ............................. | 320/108 |
| 6,016,046 A | * | 1/2000 | Kaite et al. ..................... | 320/108 |
| 6,606,020 B1 | * | 8/2003 | Kljucaricek ................... | 336/182 |
| 2002/0057164 A1 | * | 5/2002 | Jin et al. ......................... | 336/115 |
| 2004/0029311 A1 | * | 2/2004 | Snyder et al. .................. | 438/106 |
| 2004/0074086 A1 | * | 4/2004 | Yamaguchi et al. ............ | 29/745 |
| 2005/0288743 A1 | * | 12/2005 | Ahn et al. ....................... | 607/61 |
| 2006/0076922 A1 | * | 4/2006 | Cheng et al. .................... | 320/108 |
| 2006/0244416 A1 | * | 11/2006 | Yong et al. ...................... | 320/112 |
| 2008/0278112 A1 | * | 11/2008 | Hui et al. ........................ | 320/108 |

FOREIGN PATENT DOCUMENTS

JP   58-021968    2/1983
JP   09-063655    3/1997

* cited by examiner

*Primary Examiner* — Arun Williams
(74) *Attorney, Agent, or Firm* — Wenderoth, Lind & Ponack, L.L.P.

(57) ABSTRACT

A battery pack rechargeable by a magnetic induction effect incorporates a secondary coil electromagnetically coupled to a primary coil of a battery charger and a secondary battery rechargeable by electric power induced to the secondary coil. The secondary battery is in a form of a thin battery having a larger width than a thickness, and two opposing surfaces of the secondary battery are composed of a first flat surface and a second flat surface. The secondary coil is in a form of a planar coil with a wire material being spirally coiled in the plane. In the battery pack, the secondary coil in the form of the planar coil is fixedly layered on the first flat surface of the thin battery.

17 Claims, 16 Drawing Sheets

BATTERY PACK WITH A SECONDARY COIL ELECTROMAGNETICALLY RECHARGEABLE BY MAGNETIC INDUCTION EFFECT

BACKGROUND OF THE INVENTION

1. Field of the Invention

The present invention relates to a battery pack which is rechargeable by a magnetic induction effect.

2. Description of the Related Art

A battery pack rechargeable by a magnetic induction effect is charged by using a contactless battery charger. The battery packs where a battery is rechargeable in such a method are disclosed in Japanese Laid-Open Patent Publication No. H09-063655 (1997) and Japanese Laid-Open Utility Model Publication No. S58-021968 (1983). The battery pack described in Japanese Laid-Open Patent Publication No. H09-063655 (1997) has a secondary coil disposed within its casing. The secondary coil, being provided in a flexible circuit board, is disposed inside the casing.

The battery pack described in Japanese Laid-Open Utility Model Publication No. S58-021968 (1983) has a secondary coil fixed, in a layered state, to the bottom of a tubular battery. The battery pack thus structured can be charged, being placed on the charger, without being connected to the charger via a connector. Such structure allows various models of battery packs to be set and charged on a single piece of charger. Further, the battery pack, being incorporated in a mobile electronic device, can also be set to charge the mobile electronic device. This feature allows, for example, various models to be applied, also facilitating a convenient charge when the charger is incorporated in a battery pack and a cellular phone, models of which are frequently changed.

SUMMARY OF THE INVENTION

The battery packs disclosed in Japanese Laid-Open Patent Publication No. H09-063655 (1997) and Japanese Laid-Open Utility Model Publication No. S58-021968 (1983), while being so structured as to quickly charge in a shorter time, are unable to be made thin enough in their entire structures. The battery pack according to Japanese Laid-Open Utility Model Publication No. S58-021968 (1983), in particular, cannot be made thin enough in its entirety, because a secondary coil is disposed to the bottom of a tubular battery. The battery pack according to Japanese Laid-Open Patent Publication No. H09-063655 (1997) is unable to have a large amount of current capacity for the secondary coil, because the secondary coil is incorporated inside the casing and further the secondary coil is fabricated by an etching process or the like. This is because the secondary coil fabricated by an etching process uses a thin metallic foil such as a copper foil. For this reason, a large amount of electric current cannot be flown through the secondary coil to quickly charge the secondary battery within a short time. A secondary coil can certainly be made of a metallic wire in a large gauge to increase a current capacity for the secondary coil. However, in a structure where a secondary coil of a metallic wire in a large gauge is incorporated within the casing and further a battery is placed inside, it is impossible to make such battery pack thin enough. That is to say, there exists a trade-off between a quick chargeability of a battery in a large amount of current and a fabrication of a thinner battery pack, thus making it extremely difficult to satisfy the both requirements.

It should be noted that the battery pack incorporated in a mobile electronic device has to be made as thin as possible to yet allow for a largest possible amount for discharge/charge operation. In particular, in the case of a cellular phone to which a battery pack is mainly applied, it is impracticable to use anything other than a very thin battery pack.

The present invention has been made in order to overcome the above-mentioned difficulties, and it is the primary object of the invention to provide a battery pack which is, while being thin enough in its entirety, charged by a magnetic induction effect allowing a quick charge in a large amount of current.

The present battery pack rechargeable by the magnetic induction effect is so structured as to include the following configuration in order to achieve the above-described object.

The battery pack rechargeable by the magnetic induction effect incorporates both a secondary coil 1, which is electromagnetically coupled to a first coil 113 in the charger 110, and a secondary battery 2, which is charged by electric power induced to the secondary coil 1. The secondary battery 2 is in a form of a thin battery 2A having a larger width than a thickness, and two opposing surfaces of the battery are composed of a first flat surface 2a and a second flat surface 2b. The secondary coil 1 is in a form of a planar coil in which a wire material is spirally coiled in a flat form. The battery pack has the secondary coil 1, in the form of the planar coil, fixedly layered on the first flat surface 2a of the thin battery 2A.

The above-described battery pack rechargeable by the magnetic induction effect carries the feature that, while being made thin in its entirety, a quick charge can be performed in a large amount of current. This is possible because the above-described battery pack has a flat surface of a thin battery, with a larger width than a thickness, layered with a flat coil where the wire material is spirally coiled in a flat form on the surface. The battery pack is able to increase the current capacity by enlarging a size of wire in the secondary coil in the form of the planar coil where the wire is spirally coiled. The secondary coil having a large amount of current capacity is allowed to supply high power from the first coil with a reduced heat generation while inducing the high power, so that the high power induced by the second coil is able to quickly charge the thin battery in a large amount of current, with a shorter time for charging.

The above and further objects of the present invention as well as the features thereof will become more apparent from the following detailed description to be made in conjunction with the accompanying drawings.

DETAILED DESCRIPTION OF THE PREFERRED EMBODIMENT(S)

Figure 1:
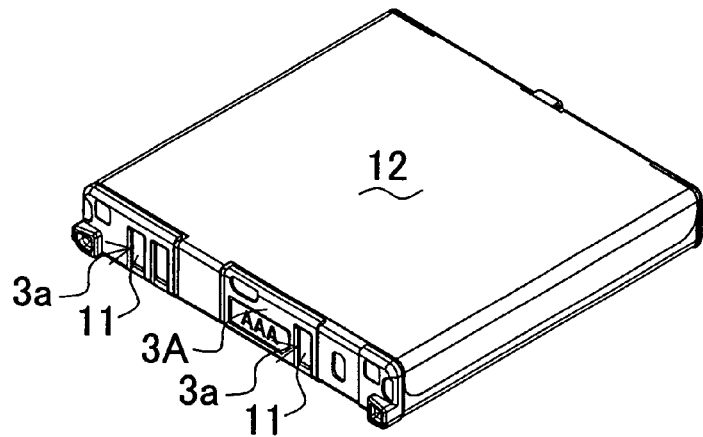
FIG. 1 is a perspective view of the battery pack in accordance with a first embodiment of the present invention.

The present battery pack rechargeable by the magnetic induction effect incorporates a secondary coil 1 and a secondary battery 2. The secondary battery 2 is in a form of a thin battery 2A, and the secondary coil 1 is in a form of a planar coil.

In the present battery pack, a wire material for the secondary coil 1, 71 is made of a plurality of insulated metallic wires 19, 79, each surface of which is insulated by an insulating coating. The metallic wires are laid in a parallel relationship with respect to a first flat surface 2a of the thin battery 2A, and are made into the form of the planar coil being spirally coiled. Further, the plurality of insulated metallic wires 19, 79 being disposed in such a parallel relationship and spirally coiled can be electrically connected in parallel.

In the present battery pack, the wire material for the secondary coil 81 is an insulated metallic wire 88, each surface of which is insulated by an insulating coating. Further, the insulated metallic wire 88 can be contoured in a cross-sectional shape, in which a width parallel to the first flat surface 2a of the thin battery 2A is made larger than a thickness orthogonal to the flat surface.

The above-described battery pack, with its wire material of the secondary coil being uniquely structured, is able to quickly charge in a short time in a large amount of current capacity, without making the planar coil thick. In the case of the secondary coil, the plurality of insulated metallic wires are insulated on the surface with the insulating coating and are laid in a parallel relationship with respect to the first flat surface of the thin battery to make up a planar coil being spirally coiled. Further, such secondary coil, with the plurality of insulated metallic wires being disposed in a parallel relationship with respect to one another and spirally coiled, is able to increase the current capacity by five times when, for example, five pieces of insulated metallic wires are electrically connected in parallel.

Further, in the case of the secondary coil, where the surface is insulated with an insulating coating on the surface and further the insulated metallic wire has its cross-sectional shape with its width parallel to the flat surface of the thin battery being made larger than the thickness orthogonal to the flat surface, such secondary coil is able to increase the current capacity by five times or more when the width is made five times the thickness of the insulated metallic wire.

The present battery pack includes a rectangular frame casing 3 for covering a periphery of the flat surface of the tin battery 2; a circuit board 4 placed between the frame casing 3 and the thin battery 2; and a circuit board holder 5, 25 for placing the circuit board 4 in position. The circuit board holder 5, 25 can be provided in an integral form with a spacer 8, 28 which covers the first flat surface 2a of the thin battery 2A. The spacer 8, 28 has a fitting-in recess 8A for fitting the secondary coil 1 on the spacer surface, or alternatively can be provided with a fitting-in hole 28B, extended through the both sides of the spacer surface, for fitting the secondary coil 1. Further, the battery pack places the frame casing 3 outside the thin battery 2A, as well as placing the circuit board 4 in position between the frame casing 3 and the thin battery 2A, by using the circuit board holder 5, 25. Further, the spacer 8, 28 of the circuit board holder 5, 25 is layered on the first flat surface 2a of the thin battery 2A, and the secondary coil 1 in the form of the planar coil is placed in the fitting-in recess 8A or the fitting-in hole 28B in the spacer 8, 28, so that a battery assembly 10, 20 can be made up with an outer surface of the secondary coil 1 being flush or coplanar with the peripheral surface of the fitting-in recess 8A or the fitting-in hole 28B in the spacer 8, 28. Further, the battery pack can have the exterior surface of the battery assembly 10, 20 covered with a plastic film 12.

The present battery pack is able to include a rectangular frame casing 3 for covering the periphery of the thin battery 2A; a circuit board 4 placed between the frame casing 3 and the thin battery 2A; a circuit board holder 35 for placing the circuit board 4 in position; and a spacer 38, 48 for covering the first flat surface 2a of the thin battery 2A. The spacer 38, 48 has a fitting-in recess 38A for fitting the secondary coil 1 on the spacer surface, or alternatively can be provided with a fitting-in hole 48B, extended through the both sides of the spacer surface, for fitting the secondary coil 1. The battery pack places the frame casing 3 outside the thin battery 2A, as well as placing the circuit board 4 in position between the frame casing 3 and the thin battery 2A, by using the circuit board holder 35. Further, the spacer 38, 48 is layered on the first flat surface 2a of the thin battery 2A, and a secondary coil 1 in the form of the planar coil is placed in a fitting-in recess 38A or a fitting-in hole 48B in the spacer 38, 48, so that a battery assembly 30, 40 can be made up with an outer surface of the secondary coil 1 being flush or coplanar with the peripheral surface of the fitting-in recess 38A or the fitting-in hole 48B in the spacer 38, 48. Further, the battery pack can have the exterior surface of the battery assembly 30, 40 covered with a plastic film 12.

The present battery pack includes a rectangular frame casing 53, 63 for covering a periphery of the tin battery 2A; a circuit board 4 placed between the frame casing 53, 63 and the thin battery 2A; and a circuit board holder 35 for placing the circuit board 4 in position. The frame casing 53, 63 can be provided in an integral form with a spacer 58, 68 which covers the first flat surface 2a of the thin battery 2A. The spacer 58, 68 has a fitting-in recess 58A for fitting the secondary coil 1 on the spacer surface, or alternatively can be provided with a fitting-in hole 68B, extended through the both sides of the spacer surface, for fitting the secondary coil 1. Further, the battery pack places the frame casing 53, 63 outside the thin battery 2A, as well as placing the circuit board 4 in position between the frame casing 53, 63 and the thin battery 2A, by using the circuit board holder 35. Further, the spacer 58, 68 of the frame casing 53, 63 is layered on the first flat surface 2a of the thin battery 2A, and the secondary coil 1 in the form of a planar coil is disposed in the fitting-in recess 58A or the fitting-in hole 68B in the spacer 58, 68, so that a battery assembly 50, 60 can be made up with an outer surface of the secondary coil 1 being flush or coplanar with the peripheral surface of the fitting-in recess 58A or the fitting-in hole 68B in the spacer 58, 68. Further, the battery pack can have the exterior surface of the battery assembly 50, 60 covered with a plastic film 12.

In the present battery pack, the spacer 8, 38, 58, 78 has the fitting-in recess 8A, 38A, 58A, 78A on the spacer surface for the secondary coil 1 to fit in, and the fitting-in recess 8A, 38A, 58A, 78A can be provided with a lower step portion 8a, 38a, 58a, 78a for disposing a central outgoing line 1a which is drawn out of the center of the second coil 1.

Further, in the present battery pack, the first flat surface 2a of the thin battery 2A can have the secondary coil 1 fixedly layered via an electromagnetic shield coating 6 on the first flat surface 2a of the thin battery 2A, as well as the electromagnetic shield coating 6 can be provided with an adhesion layer on both sides, so that the electromagnetic shield coating 6 can use a single side of the adhesion layer to be fixed on the first flat surface 2a of the thin battery 2A.

In the present battery pack, the circuit board holder placing the circuit board in position can be provided with an integrally formed spacer for covering a first flat surface of the thin battery, and also the fitting-in recess for fitting the secondary coil can be provided in the spacer surface, or the fitting-in hole for fitting the secondary coil can be provided. In the battery pack, the frame casing can be disposed outside the thin battery, the circuit board can be placed in position between the frame casing and the thin battery by means of the circuit board holder, and also the spacer of the circuit board holder can be layered on the first flat surface of the thin battery, thus placing the secondary coil in the form of the planar coil in the fitting-in recess or the fitting-in hole in the spacer, so that the battery assembly can be made up with the secondary coil being flush or coplanar with the peripheral surface of the fitting-in recess or the fitting-in hole in the spacer. Further, the exterior surface of the battery assembly can be covered with the plastic film.

In the battery pack thus structured, the secondary coil can be placed in position of the first flat surface of the thin battery, by means of the spacer integrally formed with the circuit board holder, and further the exterior can be covered with the plastic film to make the entirety thin enough. In addition, the exterior surface of the first flat surface of the thin battery on which the secondary coil is layered can be covered with the plastic film neatly and in a planar state. This is because the secondary coil is fit in the fitting-in recess or the fitting-in hole in the spacer, so that the secondary coil may be flush or coplanar with the exterior surface of the fitting-in recess or the fitting-in hole, to be covered with the plastic film.

Further, the present battery pack can be so constructed and arranged as to include a rectangular frame casing for covering the periphery of the thin battery, a circuit board disposed between the frame casing and the thin battery, a circuit board holder for placing the circuit board in position, and a spacer for covering the first flat surface of the thin battery. The spacer can be so constructed and arranged as to have a fitting-in recess for fitting the secondary coil in the spacer surface, or a fitting-in hole, extending through the both sides of the spacer surface, for fitting the secondary coil. The battery pack can dispose the frame casing outside the thin battery, dispose the circuit board in position between the frame casing and the thin battery by using the circuit board holder, and further layer the spacer on the first flat surface of the thin battery, so that the secondary coil in the form of the planar coil is fit in the fitting-in recess or the fitting-in hole in the spacer. Thus, the battery assembly can be made up by making the exterior surface of the secondary coil flush or coplanar with the peripheral surface of the fitting-in recess or the fitting-in hole in the spacer, and thus the exterior surface of the battery assembly can be covered with the plastic film.

In the battery pack thus structured, the secondary coil can be placed in position of the first flat surface of the thin battery by means of the spacer layered on the first flat surface of the thin battery, and further the outside can be covered with the plastic film to make the entirety thin enough. In addition, the exterior surface of the first flat surface of the thin battery on which the secondary coil is layered can be covered with the plastic film neatly and in a planar form. This is because the secondary coil is fit in the fitting-in recess or the fitting-in hole in the spacer, so that the secondary coil is made flush or coplanar with the exterior surface of the fitting-in recess or the fitting-in hole, to be covered with the plastic film.

Further, the present battery pack can be so constructed and arranged as to include a rectangular frame casing for covering the periphery of the thin battery, a circuit board placed between the frame casing and the thin battery, and a circuit board holder for placing the circuit board in position. The frame casing is provided with an integrally formed spacer for covering the first flat surface of the thin battery, and the spacer can be so structured as to have a fitting-in recess for fitting the secondary coil on the spacer surface, or a fitting-in hole, extended through the both sides of the spacer surface, for fitting the secondary coil. The battery pack can be so constructed and arranged that the frame casing is disposed outside the thin battery, the circuit board is placed in position between the frame casing and the thin battery by means of the circuit board holder. Further, the spacer of the frame case is layered on the first flat surface of the thin battery, and the secondary coil in the form of a planar coil is disposed in the fitting-in recess or the fitting-in hole in the spacer, so that the battery assembly can be made up by making the exterior surface flush or coplanar with the peripheral surface of the fitting-in recess or the fitting-in hole in the spacer, thus covering the exterior surface of the battery assembly with the plastic film.

In the battery pack thus structured, the secondary coil can be placed in position of the flat surface of the thin battery by using the spacer integrally formed with the frame casing and layered on the first flat surface of the thin battery, and further the outside can be covered with the plastic film to make the entirety thin enough. In addition, the exterior surface of the first flat surface of the thin battery on which the second coil is layered can be covered with the plastic film neatly and in a planar surface. This is because the secondary coil is fit in the fitting-in recess or the fitting-in hole in the spacer, so that the secondary coil is made flush or coplanar with the outside surface of the fitting-in recess or the fitting-in hole in the spacer, to be covered with the plastic film.

Further, the present battery pack can be provided with the fitting-in recess for fitting the secondary coil to the spacer surface, and also be provided with a lower step portion, placed in the fitting-in recess, for disposing a central outgoing line to be drawn out of the center of the secondary coil. Such structure carries the advantage of an ideal disposition that the central outgoing line is placed in the lower step portion, and that the exterior side of the secondary coil effectively prohibits the exterior surface of the secondary coil from protruding from the peripheral surface of the spacer. The central outgoing line layered on the planar coil is two times the wire diameter of the wire material in terms of an essential thickness of the secondary coil, so that the outgoing line layered portion becomes thicker than the other portion. In this spacer, in order to guide the layered portion of thickened central outgoing line, there is a lower step portion provided in the fitting-in recess. Since the central outgoing line is disposed in the lower step portion, the exterior surface of the secondary coil can be made flush or coplanar with the peripheral surface of the spacer, even at the layered portion of the central outgoing line where the secondary coil becomes thicker by two times.

An explanation shall be made hereinafter on the embodiments of the present invention in conjunction with the accompanying drawings.

The battery pack shown in FIG. 1 through FIG. 10 includes a secondary coil 1 electromagnetically coupled to a primary coil of the battery charger, a secondary battery 2 rechargeable by the electric power induced by the secondary coil 1, a rectangular frame casings 3, 53, 63 for covering the periphery of the secondary battery 2 in the form of a thin battery 2A, a circuit board 4 placed between the frame casing 3, 53, 63 and the thin battery 2A, and a circuit board holder 5, 25, 35 for placing the circuit board in position.

The secondary battery 2 is in the form of the thin battery 2A having a larger width than a thickness, and two opposing surfaces are composed of a first flat surface 2a and a second flat surface 2b. The first flat surface 2a and the second flat surface 2b are formed in a rectangular. Further, the secondary battery 2 is a lithium-ion battery or a polymer battery. The polymer battery is a lithium polymer battery. The secondary battery, however, may be any rechargeable kinds of batteries including a nickel-hydrogen battery and a nickel-cadmium battery.

Figure 11:
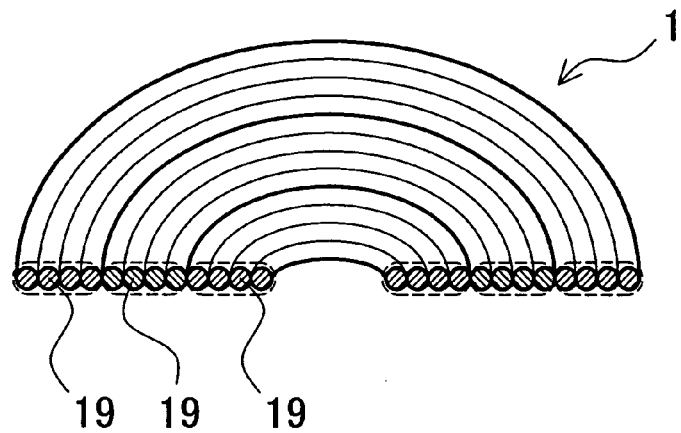
FIG. 11 is an enlarged, cross-sectional, perspective view showing an example of a secondary coil.
Figure 12:
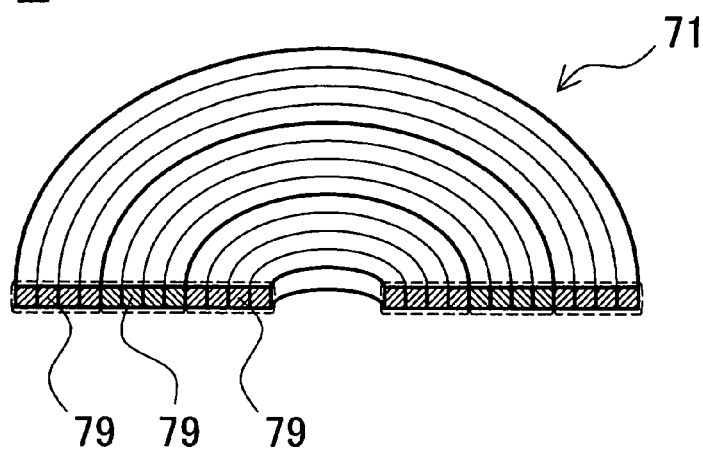
FIG. 12 is an enlarged, cross-sectional, perspective view showing another example of a secondary coil.

The secondary coil 1 is in the form of a planar coil where a wire material is spirally coiled on a surface, and retains a given form being integrated with an adhesive material or a painting material. The secondary coil 1 in the form of the planar coil is fixed, via an electromagnetic coating 6, to the first flat surface 2a of the thin battery 2A. Shown in FIGS. 11 and 12 are cross-sectional perspective views of the wire material used in the secondary coil 1, 71. The secondary coil 1, 71 shown in these Figures has a plurality of insulated metallic wires 19, 79 connected in parallel with one another. In these Figures, the plurality of insulated metallic wires 19, 79 to be connected mutually in parallel are shown in the same directional hatching, and are also enclosed by a chain line. The chain line is merely intended to clarify a section of each wire material, and the line does exist in the actual secondary coil 1, 71. The insulated metallic wire 19, 79 is a methylal (or formal) wire or an enameled wire, the surface of which is insulated by an insulating coating. The plurality of insulated metallic wires 19, 79 are laid in parallel on the first flat surface 2a of the thin battery 2A, and are in the form of the planar coil being spirally coiled. In the illustrated secondary coil 1, 71, four pieces of insulated metallic wires 19, 79 are laid in parallel on the first flat surface, and are in the form of the planar coil which is spirally and concentrically coiled. The four pieces of insulated metallic wires 19, 79 are connected at their both ends for a mutually parallel connection. The thickness of the secondary coil 1, 71 forms a size of a single piece of insulated metallic wire 19, 79, and the current capacity becomes equivalent to a multiplicity of the number of insulated metallic wires 19, 79 connected in parallel, that is, four times in this particular instance. Therefore, in the case of the secondary coil 1, 71 shown in FIGS. 11 and 12, when the number of insulated metallic wires 19, 79 connected in parallel is increased, with the thickness remaining the same, the current capacity can be increased to a corresponding multiplicity. The secondary coil 1 shown in FIG. 11 is circular in the cross section of the insulated metallic wire 19. The secondary coil 71 shown in FIG. 12 is rectangular in the cross section of the insulated metallic wire 79. In regard to the secondary coil 71, since the adjoining gap existing between the insulated metallic wires 78 can be reduced to minimum, it is possible to increase the current capacity when the size of the cross section area is enlarged in a single piece of insulated metallic wire 78.

Figure 13:
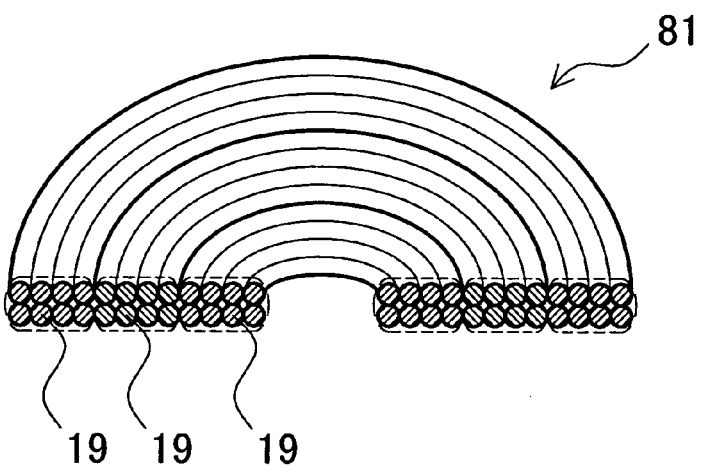
FIG. 13 is an enlarged, cross-sectional, perspective view showing even another example of a secondary coil.

The secondary coil 1, 71 shown in FIGS. 11 and 12 is in a single tier of flatly coiled wire material, but the secondary coil can be in a plurality of tiers of flatly coiled wire materials as shown in FIG. 13. The secondary coil shown in FIG. 13 is in the form of planar coil where eight pieces of insulated metallic wires 19 are arrayed in two tiers by four lines (or columns) and are spirally and concentrically coiled. In this secondary coil 81, the eight pieces of insulated metallic wires 19 have their both ends connected for a mutually parallel connection. Such structure where the wire materials are arrayed in a plurality of tiers carries the advantage that the current capacity can be increased by several times, because the number of wire materials connected in parallel can further be increased. The current capacity from this secondary coil 81 is eight times the current capacity from a secondary coil composed on a single piece of wire material, and is two times the current capacity from the secondary coil 1 shown in FIG. 11. The illustrated secondary coil 81 is layered in two tiers of coiled wire materials, but it is also possible to layer the coiled wire materials in three or more tiers. However, in the case of the wire materials arrayed in a plurality of tiers, the number of horizontal arrays, namely the number of lines (or columns) should be larger than the number of stacked arrays, namely the number of tiers. This is because the current capacity is increased while the entirety is made thinner.

Figure 14:
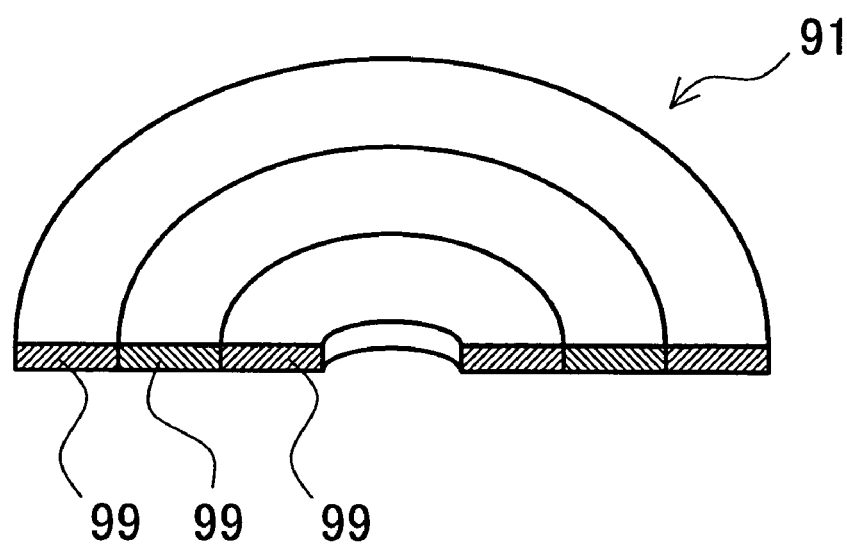
FIG. 14 is an enlarged, cross-sectional, perspective view showing a further example of a secondary coil.

Further, in the wire material in the secondary coil 91 shown in a cross-sectional, perspective view in FIG. 14, the insulated metallic wire 99 with its surface being insulated by a insulating coating is not circular in its cross-sectional form. The insulated metallic wire 99 has a larger width parallel to the first flat surface of the thin battery than the thickness orthogonal to the flat surface. The illustrated insulated metallic wire 99 is rectangular in its cross-sectional form, and is in the form of the planar coil being spirally coiled, in position where the elongated side is parallel to the first flat surface. The secondary coil 91 thus structured is in a larger width of the insulated metallic wire 99, so that the current capacity is increased with respect to the thickness of the planar coil. For example, in the case of the insulated metallic wire 99 with the width being four times the thickness, the current capacity can be increased by four times or more when the thickness remains the same as the in the planar coil of insulated metallic coil with its cross-sectional form being circular. Therefore, the secondary coil 91 thus structured is able to increase the current capacity when the width is made larger, without the thickness being changed.

The battery pack provided with a secondary coil 1 having a large current capacity is able to quickly charge the secondary battery 2 in a large amount of current, by supplying high power to the primary coil to which the electric power is supplied by the magnetic induction effect. In the case of the battery pack which is quickly charged by having high power supplied from the primary coil, an eddy current is correspondingly increased which flows to an external can or container by the magnetic induction effect. This suffers such a disadvantage as the external can or container is heated by the eddy current. In order to avoid such disadvantage, there is an electromagnetic shield coating provided as a shield layer between the secondary coil 1 and the first flat surface 2a of the thin battery 2A.

The electromagnetic shield coating 6 serves to magnetically shield a magnetic flux line received from the primary coil so that an ill effect on the thin battery 2A may be avoided. In order to shut the magnetic flux line from the primary coil, the electromagnetic shield coating 6 is fabricated into a sheet form, which is made of a material having a large magnetic permeability, such as a amorphous metal. The electromagnetic shield coating 6 in a sheet form is layered to the first flat surface 2a of the thin battery 2A, and the secondary coil 1 is then layered on the electromagnetic shield coating 6. The electromagnetic shield coating 6 has such a shape as covers the first flat surface 2a, that is, the shape being the same rectangular as the first flat surface 2a. The electromagnetic shield coating 6 covers the entirety or substantial entirety of the first flat surface 2a.

As described above, the structure, where the secondary coil 1 is disposed via the electromagnetic shield coating 6 to the secondary battery 2, is able to avoid the affect from the magnetic flux line, for example, such an ill effect as the external can or container of the secondary battery 2 is heated by the flown-in eddy current, and also since the magnetic flux line irradiated from the primary coil does not affect the secondary battery, the electrical efficiency of being transmitted from the primary coil to the secondary coil can be advantageously increased.

The frame casing 3, 53, 63 is fabricated, with its entirety being integrally formed with a plastic material. The plastic material suitably used is a plastic material that is reinforced with a fiber such as a glass fiber and a carbon fiber to be blended, and, for example, PPS (Polyphenylene Sulfide) is typically suitable. The PPS is extremely excellent in strength. The PPS, being reinforced with a fiber, is also able to improve its impact strength. Further, the PPS is excellent in its flame retardant property, so that when the frame casing is made of e.g., PPS, a plate thickness as thin as 0.4 mm is able to meet the standard requirement of flame retardant property as stipulated by UL standard, etc. On the other hand, a polycarbonate has to have a plate thickness of 0.8 mm or more to meet such standard requirement. Therefore, the PPS, while maintaining its flame retardant property, can be made thinner for the frame casing, so that the battery pack can resultantly be miniaturized. It should be noted, however, the plastic material used for the frame casing is not specifically limited to the PPS, because other plastic materials including a polycarbonate may be used as well.

The thin battery 2A, in a state of a battery core 9, 29, 39, is stored in the frame casing 3, 53, 63. The battery core 9, 29, 39 includes the circuit board 4, a terminal component composed of a circuit board holder 5, 25, 35, and the thin battery 2A. The battery core 9, 29, 39 is such that the circuit board 4 is connected to the thin battery 2A via the circuit board holder 5, 25, 35. The battery core 9, 29, 39 has an output terminal 11 fixed to the circuit board 4 serving as the terminal component. The output terminal 11 is exposed outside through a terminal window 3a, 53a, 63a which is provided to the frame casing 3, 53, 63.

Figure 3:
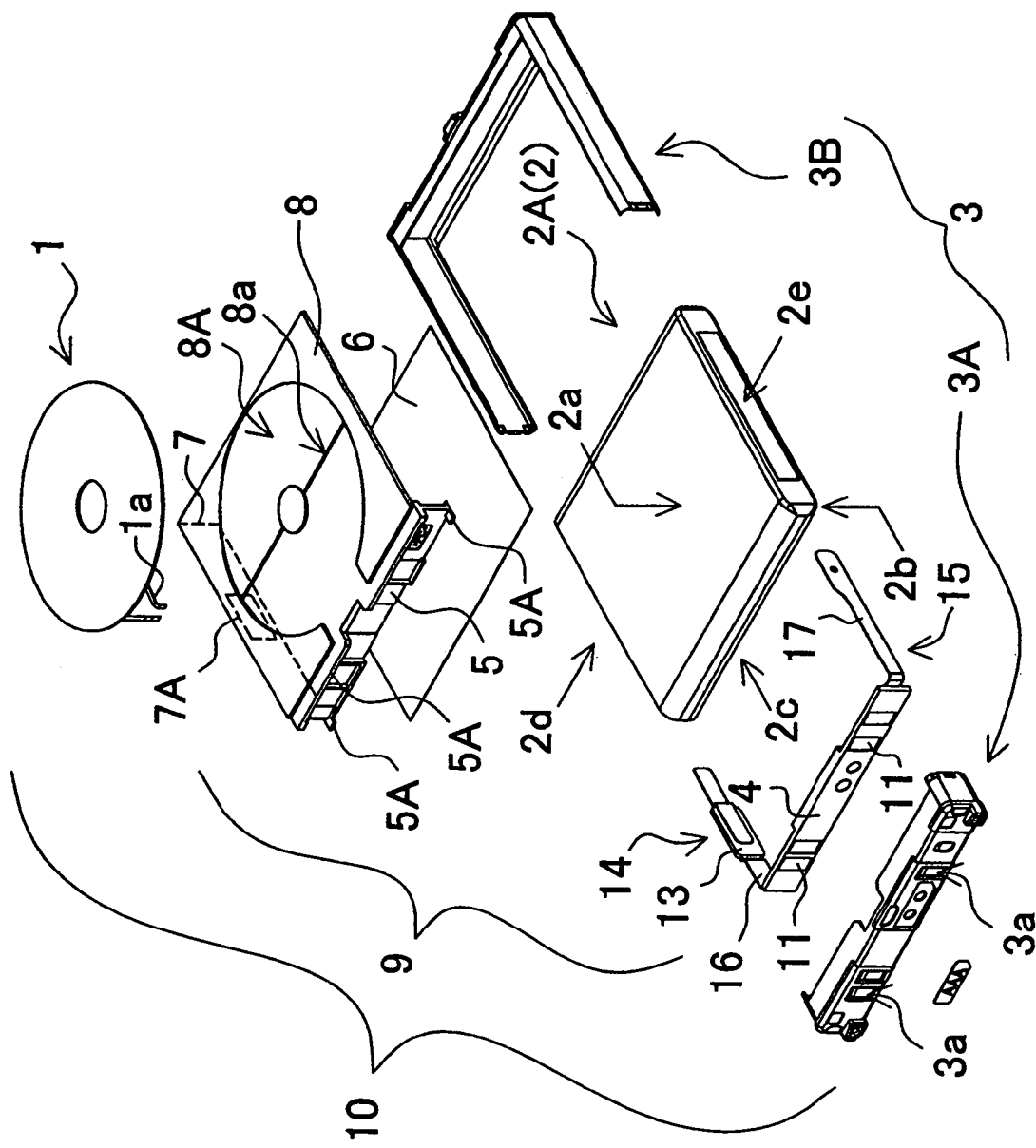
FIG. 3 is an exploded perspective view of the battery assembly shown in FIG. 2.

The battery core 9, 29, 39 has the circuit board holder 5, 25, 35 disposed between the circuit board 4 and the thin battery 2A. The circuit board holder 5, 25, 35 is integrally formed of an insulation material such as a plastic material. The circuit board 4 has the output terminal 11 fixed to the surface. Further, a battery protection circuit (not shown) is implemented in the circuit board 4. The protection circuit serves as a circuit for protecting the thin battery 2A from an excess current, or as a circuit for preventing the thin battery 2A from overcharge or over-discharge. The battery pack shown in FIG. 3 is so arranged that the PTC as a protection element 13 is a connection lead 14 at one side, which is connected to the circuit board 4 via a lead plate 16. However, it is also possible that the protection element such as the PTC and a thermal fuse is implemented in the circuit board, to connect both ends of the circuit board to the thin battery by using the lead plate, etc. The battery pack can also have the circuit board connected to the thin battery, when the protection element is the thermal fuse instead of the PTC, and the connection lead on the other end is the thermal fuse.

The circuit board holder 5, 25, 35 is interposed between the circuit board 4 and the thin battery 2A. The circuit board holder 5, 25, 35 has one surface connected to the circuit board 4, and the other end connected to a terminal surface 2c of the thin battery 2A. The circuit board holder 5, 25, 35 is provided with a positioning wall 5A, 25A, 35A along the edge on the side of connecting the circuit board 4, and the circuit board 4 is disposed along the positioning wall 5A, 25A, 35A.

In the battery pack shown in FIGS. 3, 4, 6, 7, 9 and 10, the both ends of the circuit board 4 are connected, via a lead plate 16,17 respectively to the positive and negative electrodes of the thin battery 2A. In the battery pack shown in these Figures, the connection lead 14 at one side, servicing as the protection element 13, is connected to a protruded electrode (not shown) provided to the edge surface 2d of the thin battery 2A. Further, with the lead plate 16 being elongated, the connection lead 15 on the other side, serving as the lead plate 17, is connected to a plane electrode which is an edge surface 2e of the thin battery 2A. In the battery pack shown in these Figures, the connection lead 14 at one end serves as the protection element 13, but the connection leads at both ends may also be allowed to serve as a lead plate.

The connection lead 14 connected to the protruded electrode (not shown) has to be insulated from the sealing plate of the thin battery 2A. This is because the protruded electrode and the sealing plate has opposite electrodes. In a lithium-ion secondary battery as the thin battery 2A, the protruded electrode is negative, while the sealing plate and the external can or container is positive. The external can or container of the thin battery 2A can be a metallic case. In the battery pack, since the connection lead 14 connected to the protruded electrode serves as the protection element 13, there is an insulation plate 7, 27, 37 disposed between the sealing plate and the protection element 13 which is the connection lead 14 connected to the protruded electrode, so that an insulation may be established between the connection lead 14 and the sealing plate. The illustrated insulation plate 7, 27, 37 is provided to the circuit board holder 5, 25, 35 in an integral formation. The insulation plate 7, 27, 37 is disposed opposite to a substantially entire edge surface 2c provided with the protruded electrode, and the connection lead 14 connected to the protruded electrode is insulated from the sealing plate. Further, the insulation plate 7, 27, 37 has a through hole 7A, 27A, 37A opened for exposing the protruded electrode. The connection lead 14 is connected to the protruded electrode of the thin battery 2A by means of a resistance spot welding or a laser welding. The insulation plate, however, may also be fixed, in a sheet form, to the edge surface of the thin battery by using an adhesive material or a double coated adhesive tape.

The circuit board 4 is connected, in a fitting-in structure, to a position of the circuit board holder 5, 25, 35 The illustrated circuit board holder 5, 25, 35 is provided with the positioning wall 5A, 25A, 35A along the side edge to retain the circuit board 4 in position. Further, the circuit board 4 is connected, via the connection lead 14,15 connecting the both ends, in such a manner of not being detached from the circuit board holder 5, 25, 35.

The circuit board 4, in a state of being connected in position of the circuit board holder 5, 25, 35, is connected to the thin battery 2A via the collection lead 14,15. When the circuit board 4 is connected to the thin battery 2A, the circuit board holder 5, 25, 35 is interposed between the circuit board 4 and the thin battery 2A to be placed in position. In the above-described battery core 9, 29, 39, since the circuit board holder 5, 25, 35 and the circuit board 4 are mutually connected in position, and the circuit board 4 is connected to the thin battery 2A via the connection lead 14,15, it becomes possible to connect the circuit board 4, the circuit board holder 5, 25, 35 and the thin battery 2A in a manner of not being relatively displaced from each other.

The frame casing 3, 53, 63 in its entirety is formed of a plastic material. The frame casing 3 shown in FIG. 1 through FIG. 7 is formed in a rectangular frame such that the four peripheral sides of the thin battery 2A are covered and that the frame casing 3 has an opening to expose the first flat surface 2a and the second flat surface 2b. The frame casing 3 shown in these Figures is designed to form the plastic material, with the first frame casing 3A and the second frame casing 3B being separated. The first frame casing 3A covers one side of the rectangular, thin battery 2A, while the second frame casing 3B covers the rest of three sides. The first frame casing 3A has the circuit board 4 disposed inside, and has the electrode window 3a opened for exposing, outside, the output terminal 11 fixed to the circuit board 4. The second frame casing 3B is formed in a "C" shape to cover the three sides of the rectangular, thin battery 2A, by being connected to the first frame casing 3A. The frame casing 3 connects the both ends of the first frame casing 3A and the tips of the second frame casing 3B, so that the whole periphery of the rectangular, thin battery 2A is covered.

The circuit board holder 5, 25, 35 shown in FIG. 1 through FIG. 7 is connected to the inside of the first frame casing 3A. The circuit board holder 5, 25, 35, with the circuit board 4 being disposed in position, is connected to the frame casing 3. The circuit board holder 5, 25, 35 is fabricated by forming an insulating material such as a plastic material. The circuit board holder 5, 25, 35 is fabricated by forming a plastic material into a contour being generally equal to the contour of the first frame casing 3A. Further, the circuit board holder 5, 25, 35 shown in FIGS. 3, 4, 6 and 7 is provided with a pair of positioning walls 5A, 25A, 35A on both sides, so that the circuit board 4 is placed to be fitted in position. The circuit board 4 is disposed inside the pair of positioning walls 5A, 25A, 35A, to be disposed in position of the circuit board holder 5, 25, 35.

Figure 4:
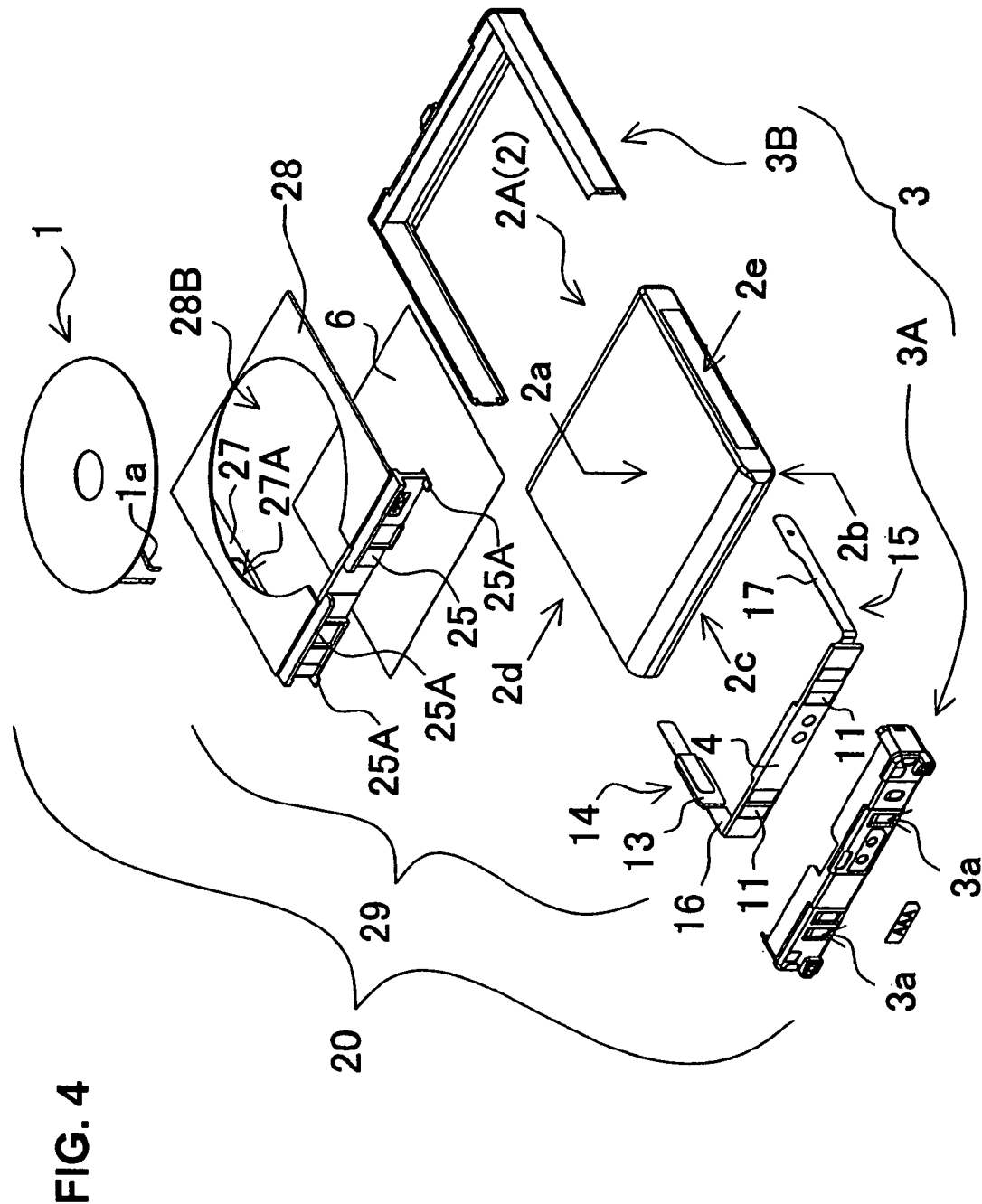
FIG. 4 is an exploded perspective view of the battery assembly in the battery pack in accordance with a secondary embodiment of the invention.

The circuit board holder 5, 25 shown in FIGS. 3 and 4 is provided with the spacer 8, 28, in an integral formation, for covering the first flat surface 2a of the thin battery 2A. The spacer 8, 28, in the form of a thin sheet layered on the first flat surface 2a, is formed into the same rectangular shape as the first flat surface 2a. The spacer 8 shown in FIG. 3 is provided with the fitting-in recess 8A for fitting the secondary coil 1 on the spacer surface. The spacer 28 shown in FIG. 4 is provided with the fitting-in hole 28B, extending through the both sides of the spacer surface, for fitting the secondary coil 1. The fitting-in recess 8A and the fitting-in hole 28B allow the secondary coil 1 in, namely fit the secondary coil 1 in, to place the secondary coil 1 in position. Therefore, the fitting-in recess 8A and the fitting-in hole 28B are made slightly larger than the contour of the secondary coil 1 for an easy insertion of the secondary coil 1, for example, being 0.2 mm to 1 mm larger than the contour of the secondary coil 1. The fitting-in recess 8A shown in FIG. 3 is provided with the lower step portion 8a which is formed a step downward, so that the central outgoing line 1a of the secondary coil 1 may be disposed. The secondary coil 1 in the form of the planar coil being spirally coiled has outgoing lines in the center portion and in the periphery. The central outgoing line 1a, being layered beneath the planar coil, is drawn out of the secondary coil 1. In the central outgoing line 1a layered on the planar coil, the substantial thickness of the secondary coil 1 is two times the wire diameter of the wire material. In order to guide the layered portion which is thickened with the central outgoing line 1a, the fitting-in recess 8A is provided with the lower step portion 8a. The central outgoing line 1a is drawn out of the central portion of the secondary coil 1 to be connected to the circuit board 4. Therefore, the fitting-in recess 8A, with the lower step portion 8a being made from the central portion of the secondary coil 1 toward the circuit board 4, disposes the central outgoing line 1a in such a location. The central outgoing line 1a is disposed beneath the planar coil, namely, on the thin battery 2A side as viewed from the planar coil face.

Figure 15:
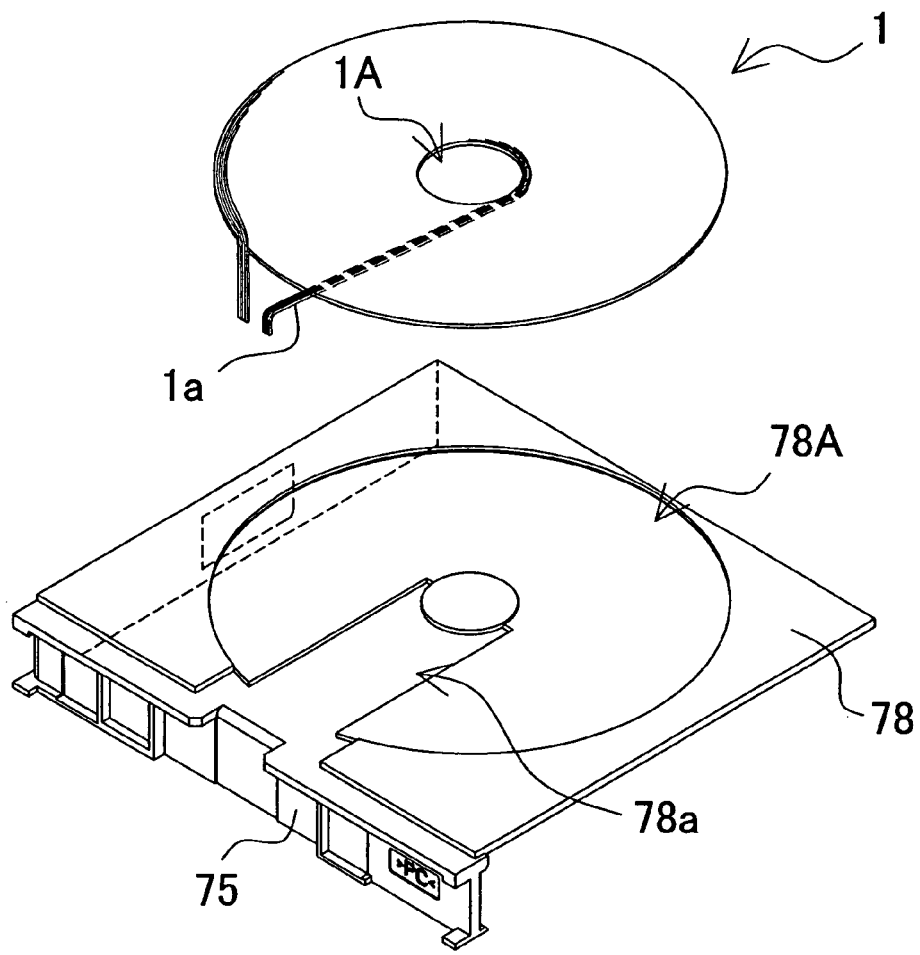
FIG. 15 is a perspective view showing another example of a lower-step portion provided to the fitting-in recess in the spacer.
Figure 16:
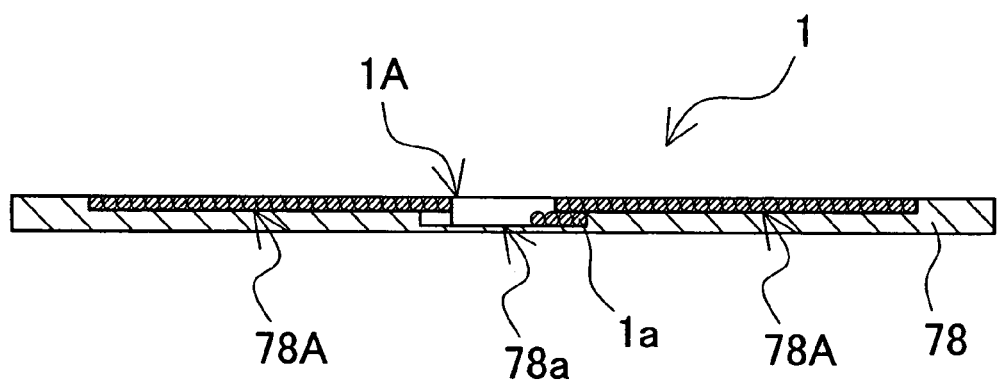
FIG. 16 is a cross-sectional view showing the state where the spacer and the secondary coil are layered as shown in FIG. 15.

In the spacer 8 shown in FIG. 3, the lower step portion 8a provided in the fitting-in recess 8A is shaped semicircular. This shape of lower step portion 8a carriers the advantage that the portion of the central outgoing line 1a drawn out of the center portion of the planar coil can be securely guided to the lower step portion 8a, to be drawn toward the circuit board 4. However, the lower step portion provided in the fitting-in recess may also be shaped like a groove as shown in FIGS. 15 and 16. The spacer 78 shown in FIG. 15 is provided with a groove-shaped, lower step portion 78a toward the circuit board holder 75 from the central portion of the planar coil fitted in the fitting-in recess 78A. The groove-shaped, lower step portion 78a as illustrated is designed to have a larger width than the diameter of the central hole 1A defined in the center of the planar coil 1, so that the central outgoing line 1a can be securely guided into the groove. In this way, the groove-shaped, lower step portion 78a also carries the advantage that the central outgoing line 1a thus guided can be positioned at a proper place, and that the wider area of the fitting-in recess 78A allows the lower surface of the planar coil to be securely supported. The lower step portion, however, is not specifically limited to the above-mentioned shape. The lower step portion may also be made in such other shape that the portion of the central outgoing line can be disposed, like in a narrow groove or in a sector or fan shape.

In the spacer 8, 28 formed integrally in the circuit board holder 5, 25, the secondary coil 1 is disposed in the fitting-in recess 8A or the fitting-in hole 28B, so that the exterior side surface of the secondary coil 1 is flush or coplanar with the peripheral surface of the spacer 8, 28. The peripheral surface is the exterior side surface of the fitting-in recess 8A or the fitting-in hole 28B. The spacer 8 provided with the fitting-in recess 8A is specifically limited in the width of the fitting-in recess 8A, so that the exterior side surface of the secondary coil 1 is flush or coplanar with the peripheral surface of the spacer 8. In the fitting-in recess 8A, the depth of the lower step portion 8a is made equivalent to the thickness of the central outgoing line 1a which is layered on the planar coil, and portions other than the lower step portion 8a are made equivalent to the thickness of the planar coil, so that the exterior side surface of the secondary coil 1 can be made flush or coplanar with the peripheral surface of the spacer 8. The spacer 28 provided with the fitting-in hole 28B is also specifically limited in the thickness so that the exterior side surface of the secondary coil 1 may be made flush or coplanar with the peripheral surface of the spacer 28. In the spacer 28, when the thickness of the spacer 28 is made equivalent to the central outgoing line 1a which is layered on the planar coil, the exterior side surface of the secondary coil 1 can be made flush or coplanar with the peripheral surface of the spacer 28.

Figure 2:
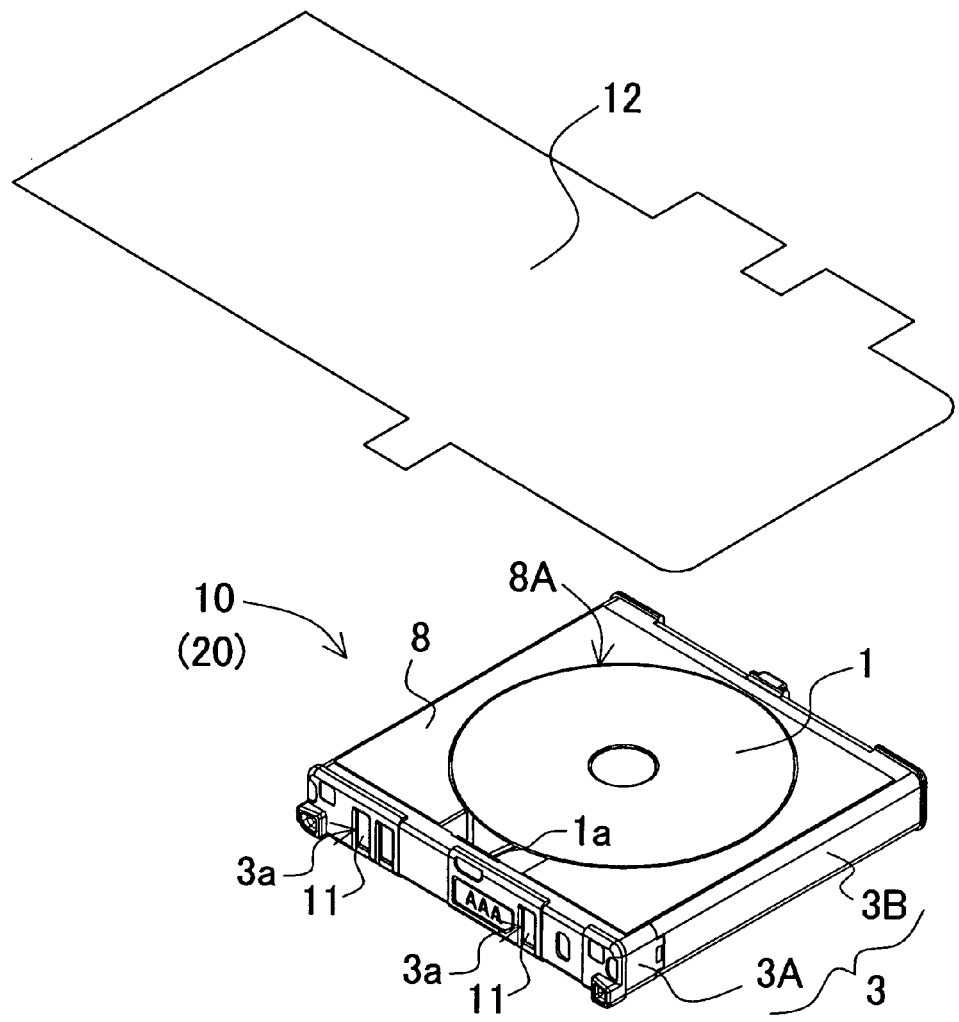
FIG. 2 is a perspective view of the battery assembly in the battery pack shown in FIG. 1.

The battery pack shown in an exploded perspective view in FIGS. 3 and 4 is assembled, in a state of the battery assembly 10, 20 shown in FIG. 2, with the exterior side surface being covered with the plastic film 12. In the battery assembly 10, 20, the secondary coil 1 is placed in the fitting-in recess 8A or the fitting-in hole 28B in the spacer 8, 28, so that the exterior side surface of the secondary coil 1 is made flush or coplanar with the peripheral surface of the spacer 8, 28. The battery assembly 10, 20 is made up in the following procedures.
(1) The electromagnetic shield coating 6 is fixed to the first flat surface 2a of the thin battery 2A. The electromagnetic shield coating 6 is fixed to the first flat surface 2a by means of the adhesive layer provided on the surface.
(2) The circuit board 4 is set in position of the circuit board holder 5, 25, and further, the secondary coil 1 is placed to the fitting-in recess 8A or the fitting-in holder 28B.
(3) The connection lead 14, 15 of the circuit board 4 is connected to the thin battery 2A in a method like a spot welding, and the circuit board 4 and the circuit board holder 5, 25 are connected to the thin battery 2 to make up the battery core 9, 29. At this state, the spacer 8, 28 which is integrally formed with the circuit board holder 5, 25 is adhered to the adhesive layer on the electromagnet shield coating 6. That is, the spacer 8, 28 of the circuit board holder 5, 25 is adhesively fixed to the first flat surface 2a via the electromagnetic shield coating 6.
(4) The first frame casing 3A and the second frame casing 3B are interconnected, and are set to the outside of the battery core 9, 29. The frame case 3 is connected to the circuit board holder 5, 25, and is fitted in a curved surface on both sides of the thin battery 2A, to be connected to the battery core 9, 29 in a manner of not being detached. The second frame case 3B is formed in an interior shape so as to be fitted in the curved surface on both sides of the thin battery 2A.

In the battery assembly 10, 20 thus assembled, the frame casing 3 is disposed outside the thin battery 2A, and the circuit board 4 is placed in position between the frame casing 3, 23 and the thin battery 2A by means of the circuit board holder 5, 25. Further, the spacer 8, 28 of the circuit board holder 5, 25 is layered, via the electromagnetic shield coil 6, on the first flat surface 2a of the thin battery 2A, and the secondary coil 1 of the planar coil is placed in the fitting-in recess 8A or the fitting-in hole 28B in the spacer 8, 28, so that the exterior side surface of the secondary coil 1 is made flush or coplanar with the peripheral surface of the fitting-in recess 8A or the fitting-in hole 28B in the spacer 8, 28.

The plastic film 12 is attached to the outside of the battery assembly 10, 20. The plastic film 12 is an insulation sheet such as a label. The plastic film 12 is adhered to the first flat surface 2a and the second flat surface 2b of the thin battery 2A, and also to the exterior side surface on the opposing side frames of the secondary frame casing 3B. In the battery pack shown in FIG. 1, the plastic film 12 is adhered to the four sides of the frame casing 3, and further the plastic film 12 is U-bent to be attached to the surface of the second flat surface 2b as well.

The plastic film 12 is an insulation sheet or label made of a flexible plastic material. The plastic film 12 is adhered, via an adhesion material or an adhesive layer, to the thin battery 2A and frame casing 3.

Figure 5:
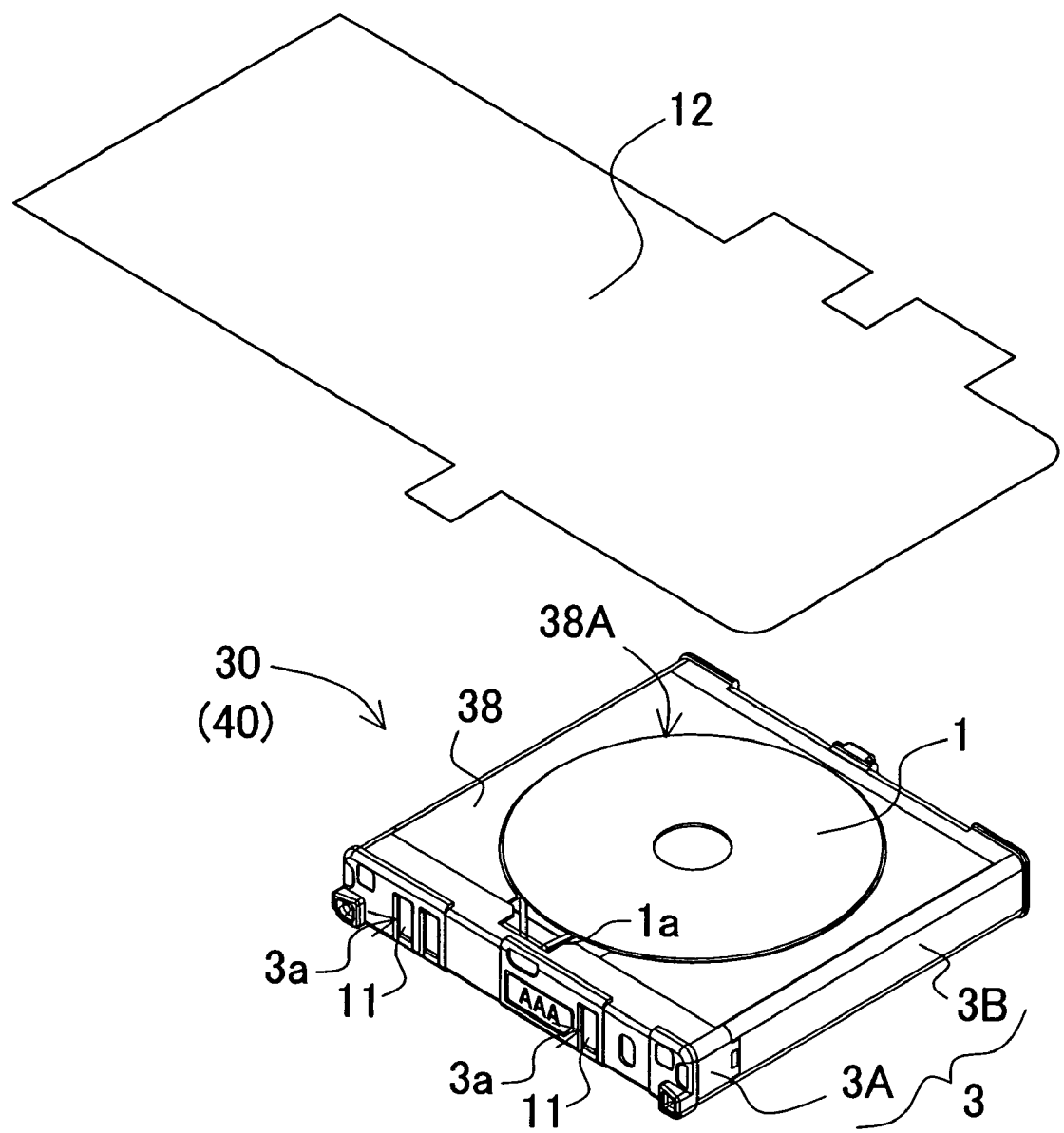
FIG. 5 is a perspective view of the battery assembly in the battery pack in accordance with a third embodiment of the invention.
Figure 6:
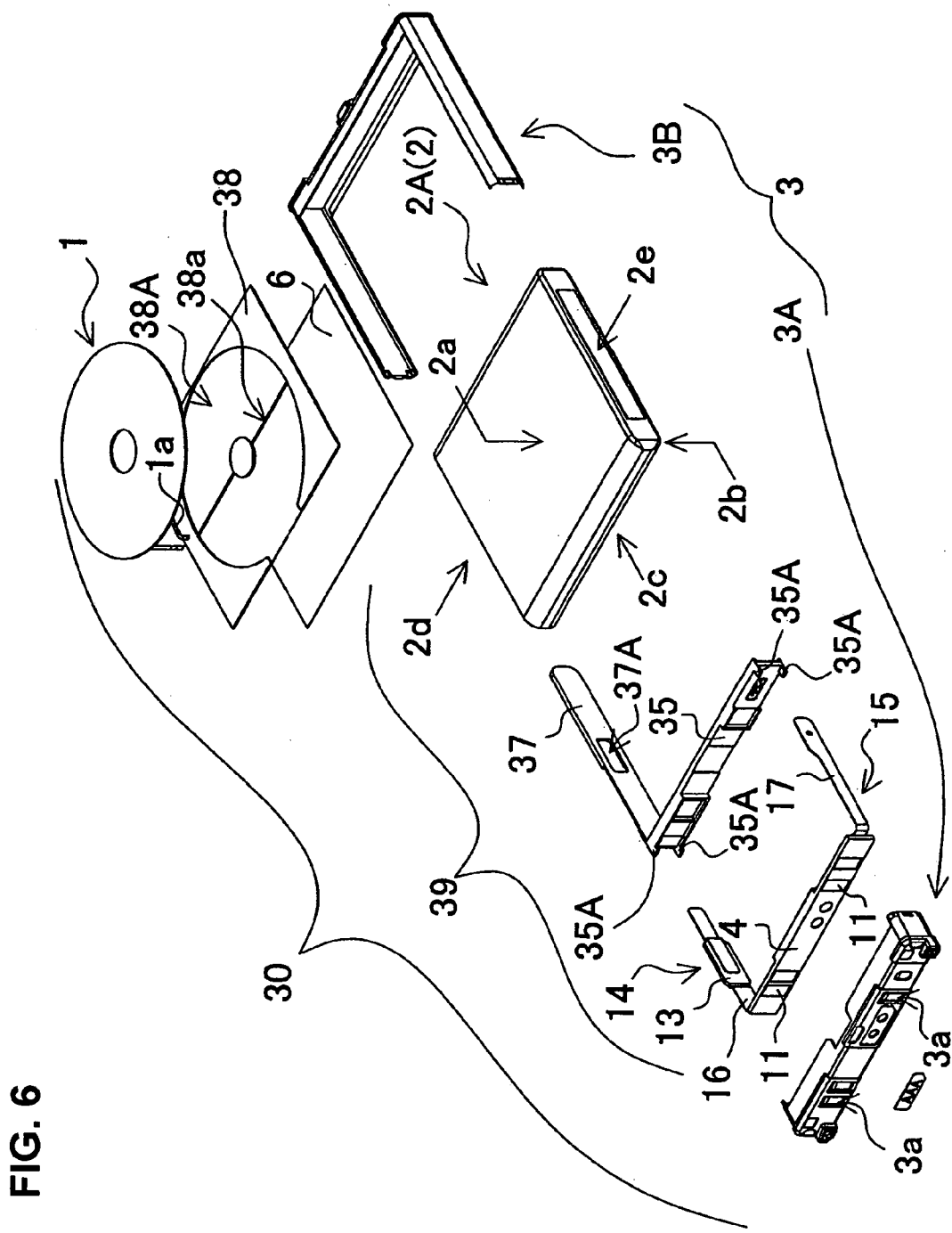
FIG. 6 is an exploded perspective view of the battery assembly shown in FIG. 5.
Figure 7:
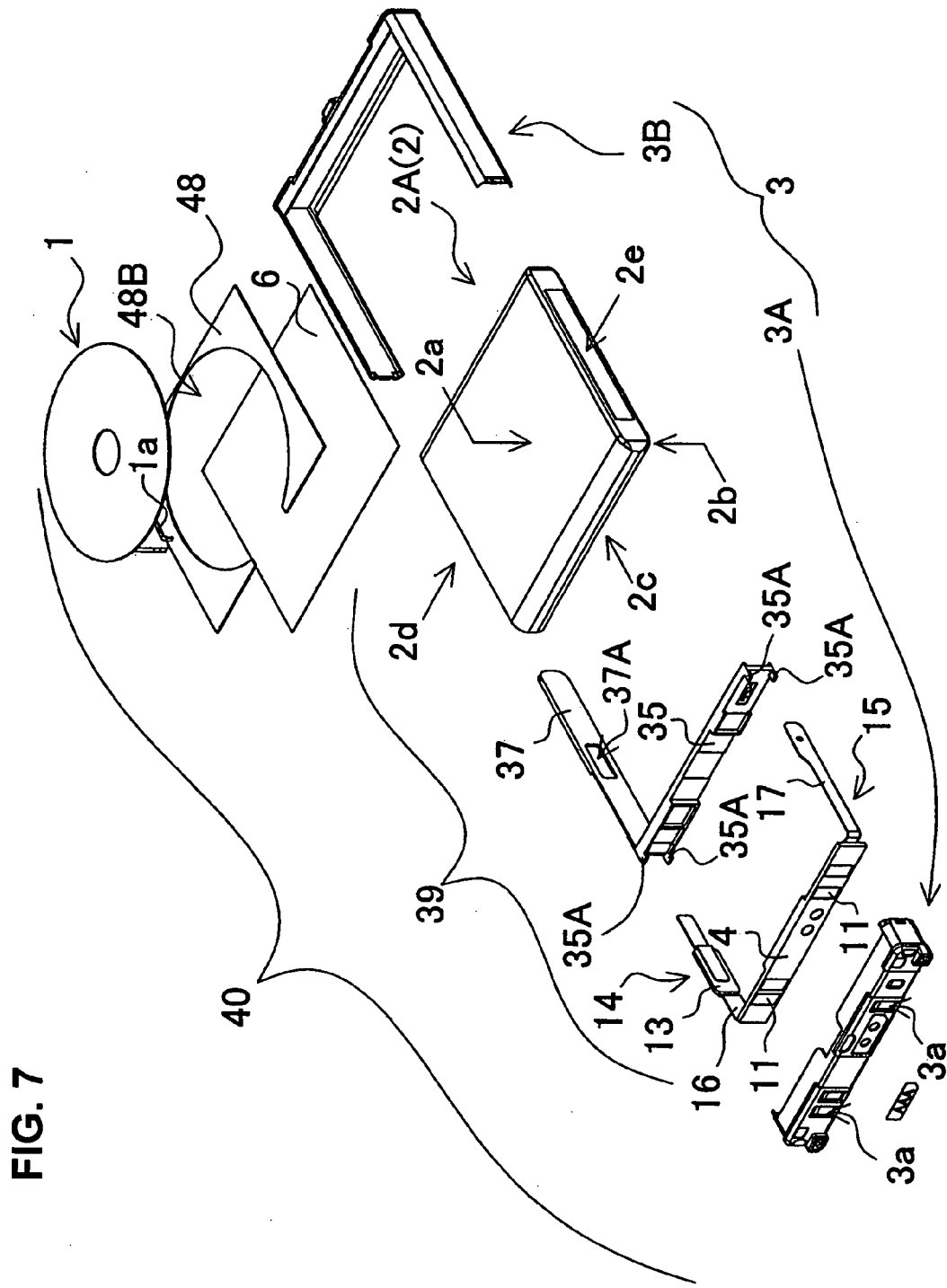
FIG. 7 is an exploded perspective view of the battery assembly in the battery pack in accordance with a fourth embodiment of the invention.

In the battery pack shown in FIGS. 5 through 7, the spacer 38, 48 is formed of a plastic material, as a component being separate from the circuit board holder 35. The spacer 38 shown in FIG. 6 is formed in the same shape as the spacer 8 shown in FIG. 3, except for being formed separately from the circuit board holder 35. That is, the spacer 38 is provided with the fitting-in recess 38A for fitting the secondary coil 1 to the spacer surface, and is also provided with the lower step portion 38a to the fitting-in recess 38A. Further, the spacer 48 shown in FIG. 7 is formed in the same shape as the spacer 28 shown in FIG. 4, except for being formed separately from the circuit board holder 35. That is, the spacer 48, with both faces being extended through, has the fitting-in hole 48B for fitting the secondary coil 1 in.

The battery pack shown in an exploded perspective view in FIGS. 6 and 7 is assembled, in a state of the battery assembly 30, 40 as shown in FIG. 5, with the exterior side surface being covered with the plastic film 12. In the battery assembly 30, 40, the secondary coil 1 is placed in the fitting-in recess 38A or the fitting-in hole 48B in the spacer 38, 48, so that the exterior side surface of the secondary coil 1 is made flush or coplanar with the peripheral surface of the spacer 38, 48. The battery assembly 30, 40 is made up in the following procedures.
(1) The electromagnetic shield coating 6 is fixed to the first flat surface 2a of the thin battery 2A. The electromagnetic shield coating 6 is fixed to the first flat surface 2a by means of the adhesive layer provided on the surface.
(2) The secondary coil 1 is set to the fitting-in recess 38A or the fitting-in hole 48B in the spacer 38, 48, and is fixed to the first flat surface 2a of the thin battery 2A. The spacer 38, 48 and the secondary coil 1 are placed, via the adhesive layer on the electromagnetic shield coating 6, in position of the first flat surface 2a.
(3) The circuit board 4 is set in position of the circuit board holder 35, the connection lead 14,15 of the circuit board 4 is connected to the thin battery 2A in a method such as a spot welding, and the circuit board 4 and the circuit board holder 35 are connected to the thin battery 2A to make up the battery core 39.
(4) The first frame casing 3A and the second frame casing 3B are interconnected and are set to the outside of the battery core 39. The frame casing 3 is connected to the circuit board holder 35, and is fitted in a curved surface on both sides of the thin battery 2A, to be connected to the battery core 39 in a manner of not being detached. The second frame casing 3B is formed in an interior shape so as to be fitted in the curved surface on both sides of the thin battery 2A.

In the battery assembly 30, 40 thus assembled, the frame casing 3 is disposed outside the thin battery 2A, and the circuit board 4 is placed in position between the frame casing 3 and the thin battery 2A by means of the circuit board holder 35. Further, the spacer 38, 48 is layered, via the electromagnetic shield coil 6, on the flat surface of the thin battery 2A, and the secondary coil 1 in the form of the plastic coil is placed in the fitting-in recess 38A or the fitting-in hole 48B in the spacer 38, 48, so that the exterior side surface of the secondary coil 1 is made flush or coplanar with the peripheral surface of the fitting-in recess 38A or the fitting-in hole 48B in the spacer 38, 48.

The plastic film 12 is attached to the outside of the battery assembly 30, 40. The plastic film 12, being the same as the plastic film attached to the battery assembly 10, 20 shown in FIG. 2, is attached to the battery assembly 30, 40 in the same manner.

Figure 8:
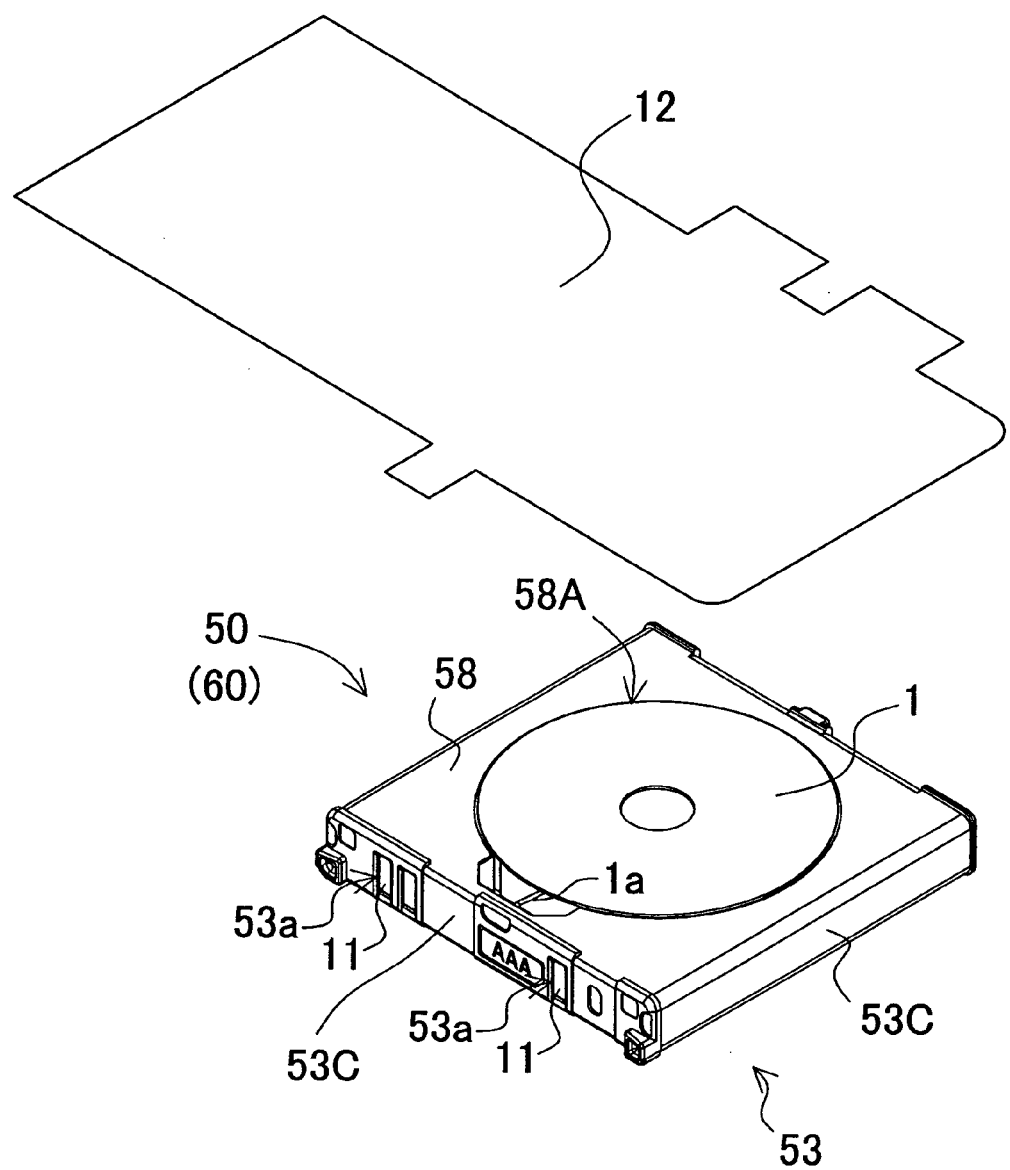
FIG. 8 is a perspective view showing the battery assembly in the battery pack in accordance with a fifth embodiment of the invention.
Figure 9:
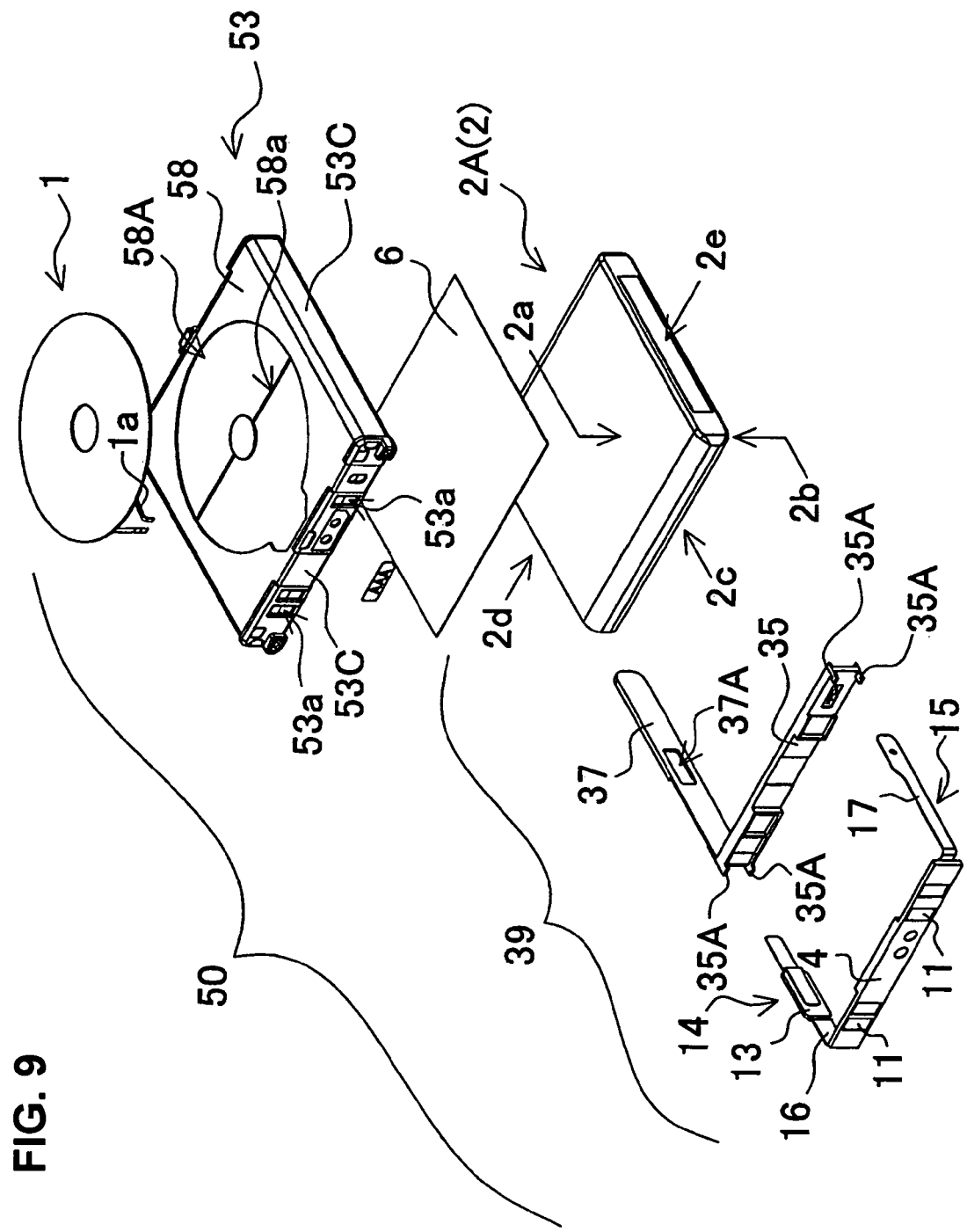
FIG. 9 is an exploded perspective view of the battery assembly shown in FIG. 8.
Figure 10:
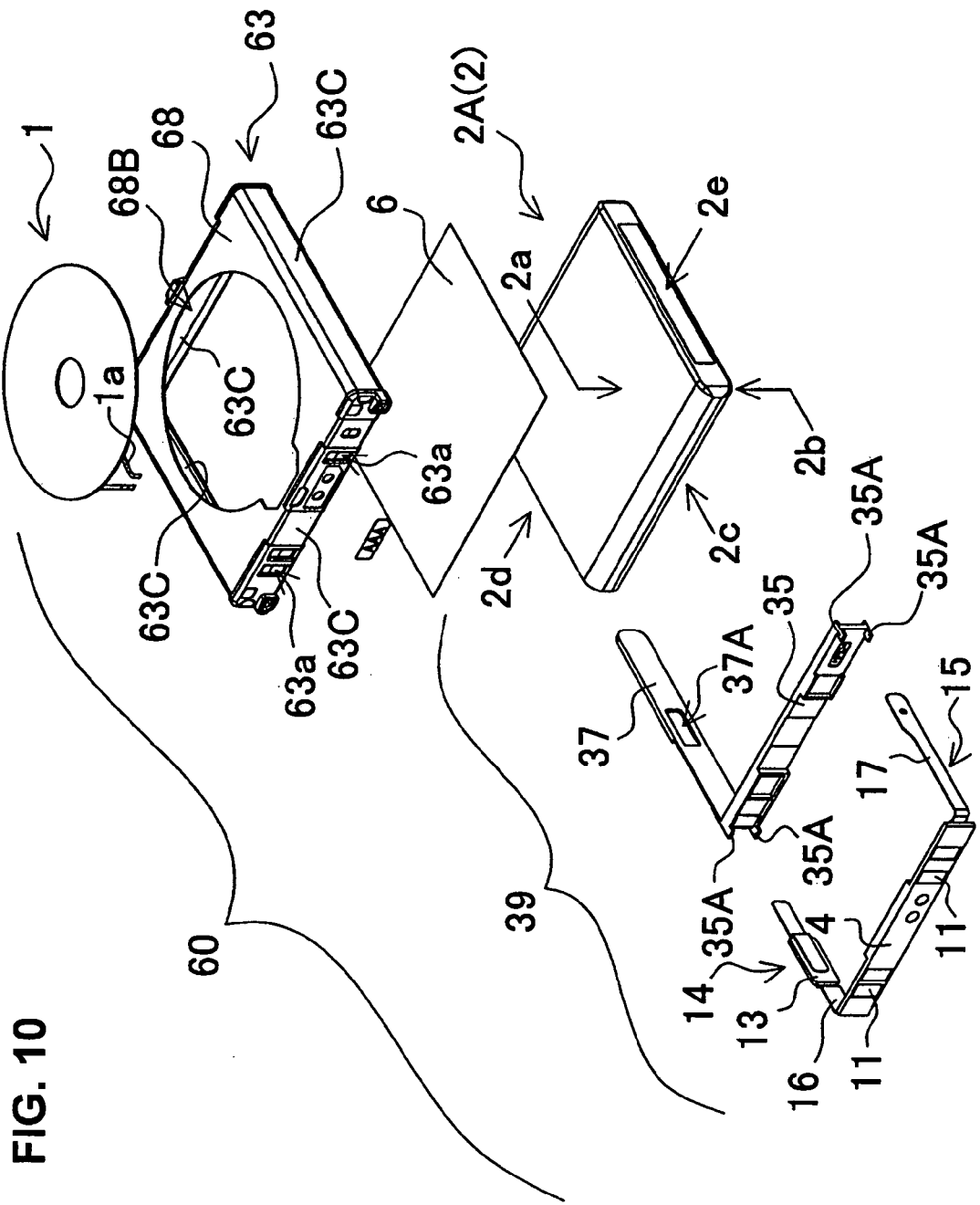
FIG. 10 is an exploded perspective view of the battery assembly in the battery pack in accordance with a sixth embodiment of the invention.

Further, in the battery pack shown in FIG. 8 through FIG. 10, the spacer 58, 68 is formed integrally in the plastic-made frame casing 53, 63. The spacer 58 shown in FIG. 9 is formed in the same shape as the spacer 8 shown in FIG. 3, except for being integrally formed in the frame casing 53. That is, in the spacer 58, the fitting-in recess 58A for fitting the secondary coil 1 in the spacer surface is provided, and the lower step portion 58a is provided in the fitting-in recess 58A Further, the spacer 68 shown in FIG. 10 is formed in the same shape as the spacer 28 shown in FIG. 4, except for being integrally formed in the frame casing 63. That is, the spacer 68, with the both faces being extended through, is provided with the fitting-in hole 68B for fitting the secondary coil 1.

In the frame casing 53, 63 shown in FIGS. 9 and 10, the entirety is formed with a plastic material. In the frame casing 53, 63, the rectangular exterior member 53C, 63C for covering the four circumferential sides of the thin battery 2A is integrally formed with the spacer 58, 68 which is layered on the first flat surface 2A, and is formed in such a configuration that the opening is provided for exposing the second flat face 2b of the thin battery 2A. The rectangular exterior member 53C, 63C, in a portion incorporating the circuit board 4 inside, have the electrode window 53a, 63a opened for exposing, to the outside, the output terminal 11 for the circuit board 4. The rectangular exterior member 53C, 63C serves to cover the four sides of the battery core 39, while the spacer 58, 68 serves to cover the first flat surface 2a.

The battery pack shown in an exploded perspective view in FIGS. 9 and 10 is assembled, in a state of the battery assembly 50, 60 as shown in FIG. 8, with the exterior side surface being covered with the plastic film 12. In the battery assembly 50, 60, the secondary coil 1 is placed in the fitting-in recess 58A or the fitting-in hole 68B in the spacer 58, 68, so that the exterior side surface of the secondary coil 1 is made flush or coplanar with the peripheral surface of the spacer 58, 68. The battery assembly 50, 60 is made up in the following procedures.

(1) The electromagnetic shield coating 6 is fixed to the first flat surface 2a of the thin battery 2A. The electromagnetic shield coating 6 is fixed to the first flat surface 2a by means of the adhesive layer provided on the surface.

(2) The circuit board 4 is set in position of the circuit board holder 35, the connection lead 14, 15 of the circuit board 4 is connected to the thin battery 2A in a method such as a spot welding, and the circuit board 4 and the circuit board holder 35 are connected to the thin battery 2A to make up a battery core 39.

(3) The battery core 39 is set inside the frame casing 53, 63. The frame casing 53, 63 is connected to the circuit board holder 35 and is also fit in a curved surface on both sides of the thin battery 2A to be connected to the battery core 39 in a manner of not being detached. Further, the spacer 58, 68 integrally formed with the frame casing 53, 63 is adhered, via an adhesive layer on the electromagnetic shield coating 6, to the thin battery 2A, so that the thin battery 2A and the frame casing 53, 63 are fixed.

(4) After the central outgoing line 1a of the secondary coil 1 is connected to the circuit board 4, the secondary coil 1 is set to the fitting-in recess 58A or the fitting-in hole 68B in the spacer 58, 68. The secondary coil 1 which is set to the fitting-in hole 68B in the spacer 68 is adhesively fixed to the first flat surface 2a via the adhesive layer on the electromagnetic shield coating 6. The second coil 1 guided to the fitting-in recess 58A can be adhesively fixed to the bottom of the fitting-in recess 58A. However, the secondary coil 1 guided to the fitting-in recess 58A does not necessary have to be adhered to the spacer 58. This is because the secondary coil 1 is fixed to the fitting-in recess 58A by means of the plastic film which covers the outside.

In the battery assembly 50, 60 thus assembled, the frame casing 53, 63 is disposed outside the thin battery 2A, the circuit board 4 is disposed in position between the frame casing 53, 63 and the thin battery 2A by means of the circuit board holder 35, and further the spacer 58, 68 of the circuit board holder 35 is layered on the first flat surface 2a of the thin battery 2, via the electromagnetic shield coating 6. The secondary coil 1 in the form of the planar coil is placed to the fitting-in recess 58A or the fitting-in hole 68B in the spacer 58, 68, so that the exterior side surface of the secondary coil 1 is made flush or coplanar with the peripheral surface of the fitting-in recess 58A or the fitting-in hole 68B in the spacer 58, 68.

The plastic film 12 is attached to the outside of the battery assembly 50, 60. The plastic film 12, of the same nature as attached to the battery assembly 10, 20 shown in FIG. 2, is attached to the battery assembly 50, 60 in the same manner.

Figure 17:
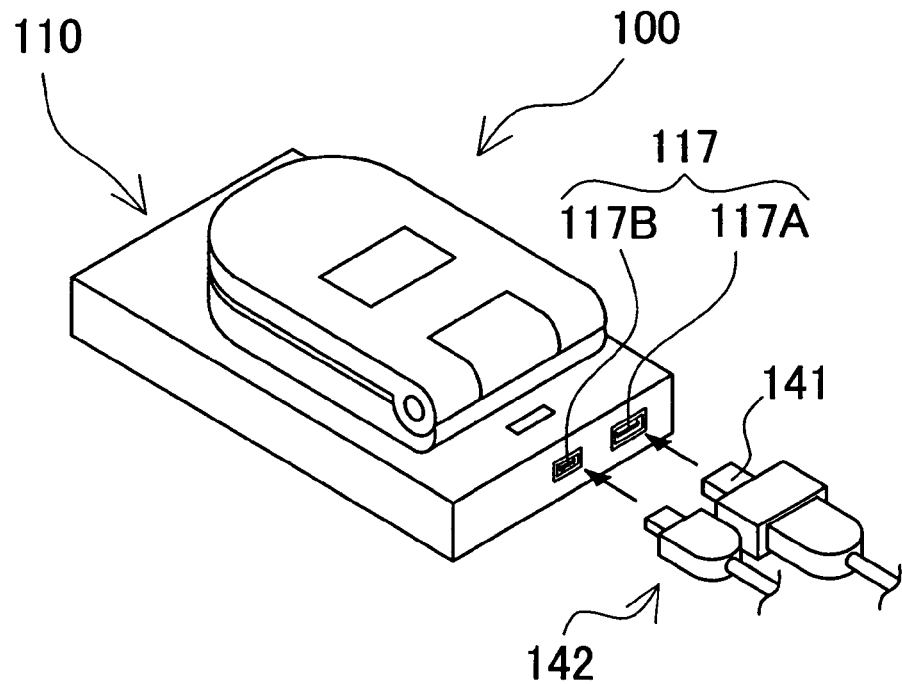
FIG. 17 is a perspective view showing the state where a mobile electronic device, incorporating a battery pack, is set to the contactless battery charger.
Figure 18:
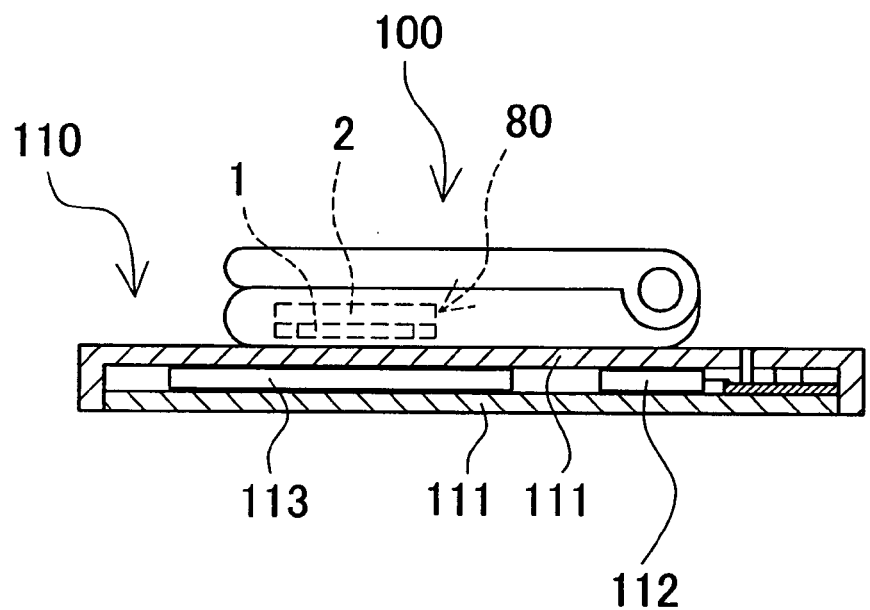
FIG. 18 is an vertical, cross-sectional view showing the state where the battery pack is charged, with a mobile electronic device being set to the battery charger, as shown in FIG. 17.
Figure 19:
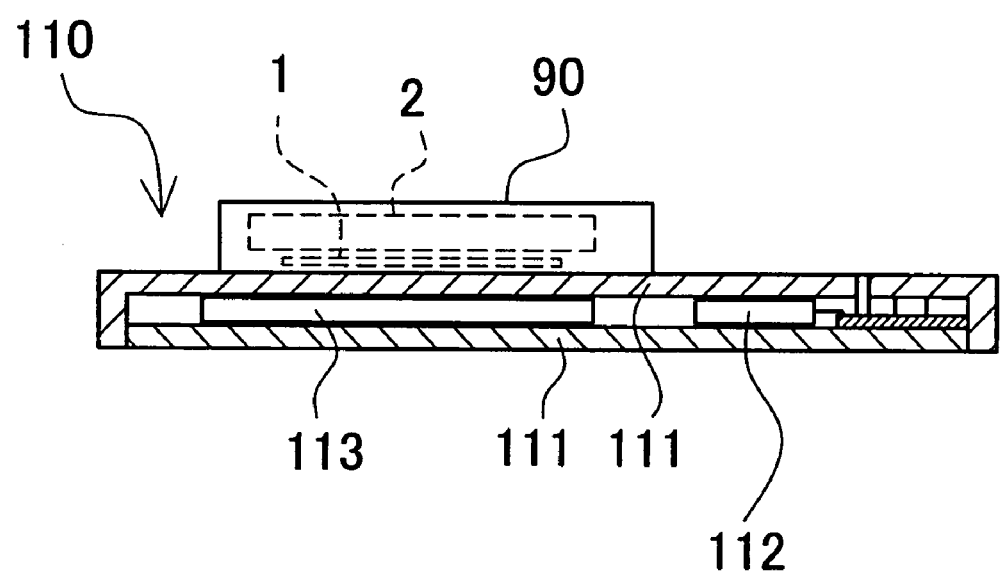
FIG. 19 is a vertical, cross-sectional view showing the state where the battery charger is charged, with the battery pack being set on, as shown in FIG. 18.
Figure 20:
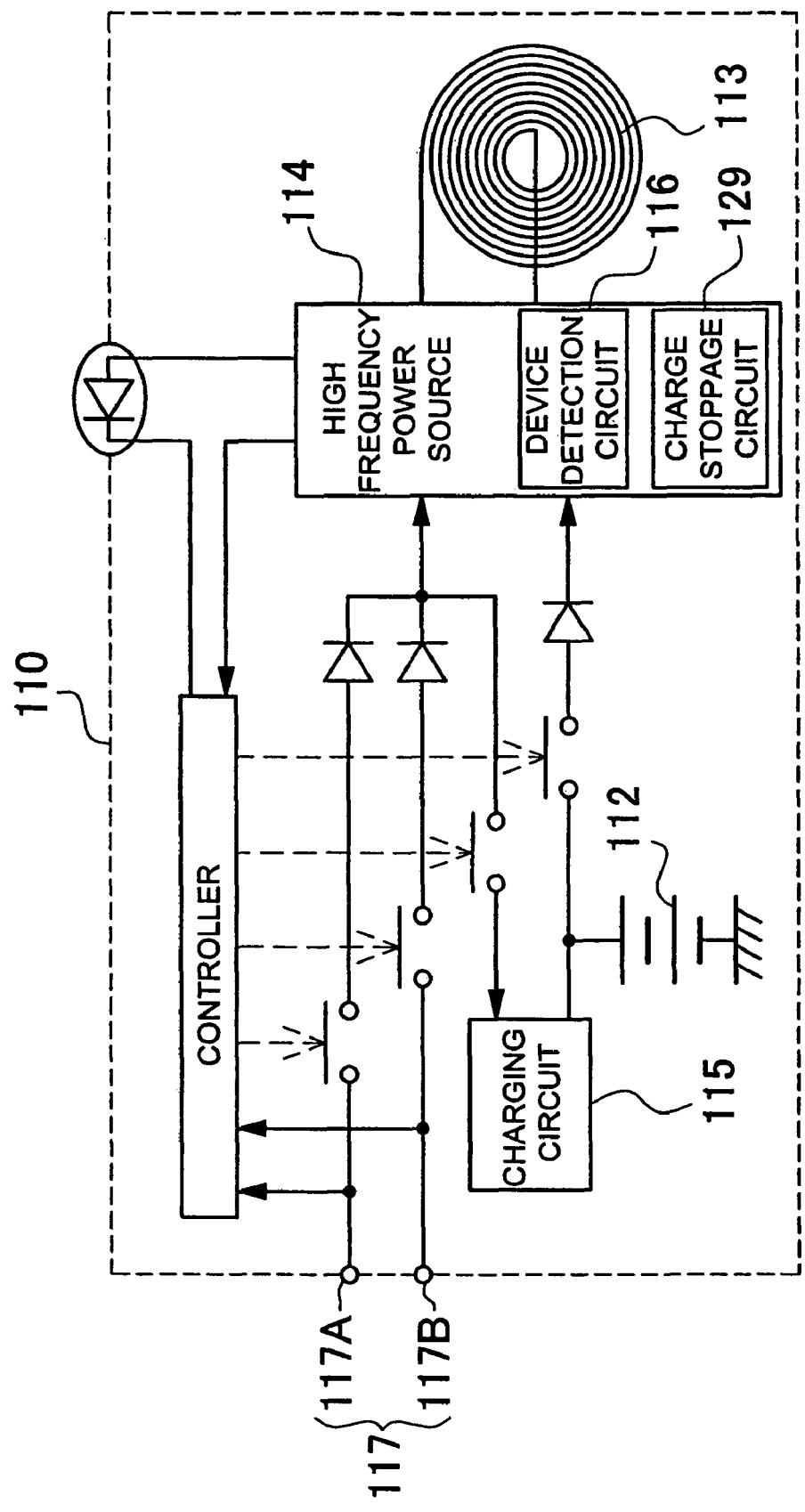
FIG. 20 is a circuit diagram of the battery charger shown in FIG. 17.

FIGS. 17 through 19 show how the above-described battery pack is charged by the battery charger. FIGS. 17 and 18 show how the mobile electronic device 100, incorporating the battery pack 80, is set to the battery charger 110 to be charged, while FIG. 19 shows how the battery pack 90 is directly set to the battery charger 110 to be charged. Further, FIG. 20 shows a circuit diagram of the battery charger 110 for charging the battery pack 80, 90.

The battery charger 110 includes a primary coil 113 electromagnetically coupled to the secondary coil 1 of the battery pack 80, 90, a high frequency power source 114 for supplying high frequency power to the primary coil 113, an incorporated battery 112 for supplying electric power to the high frequency power source 114, a charging circuit 115 of the incorporated battery 112, and an external casing 111 which incorporates the primary coil 113, the high frequency power source 114, the incorporated battery 112 and the charging circuit 115. The contactless battery charger 110 uses the high frequency power source 114 to convert the inputted electric power to the high frequency power to supply to the primary coil 113. The high frequency power of the primary coil 113 is transmitted by the magnetic induction effect to the secondary coil 1. The high frequency power which is an AC induced to the secondary coil 1 is rectified to be used for charging the battery pack 80, 90.

The illustrated, contactless battery charger 110 is not to charge the battery pack 80, 90 by inputted electric power alone, but when the inputted electric power is in a non-input state, the battery pack 80, 90 is charged by having the electric power supplied from the incorporated battery 112 to the high frequency power source 114. The incorporated battery 112, for supplying the electric power to the high frequency power source 114 in a non-input state, is a lithium-ion secondary battery or a lithium polymer battery. Further, the incorporated battery 112 is a thin, rectangular battery. The incorporated battery 112 is charged by the charging circuit 115. The charging circuit 115 converts the inputted electric power to a charging voltage of the incorporated battery 112, so that the incorporated battery 112 is charged. Since the incorporated battery 112 is a lithium-ion secondary battery or a lithium polymer battery, the charging circuit 115 is a constant-current, constant-voltage charging circuit. The charging circuit 115 charges, with a constant current, the incorporated battery 112 up to a given voltage, and when the battery voltage rises up to a predetermined level, the charging circuit 115 charges, with a constant voltage, the incorporated battery 112 until reaching a state of a full charge.

The high frequency power source 114, in a state where the mobile electronic device 100 is set or the battery pack 90 is directly set, supplies the high frequency power to the primary coil 113 to charge the battery pack 80, 90. The high frequency power source 114 incorporates a device detection circuit 116 for detecting that the mobile electronic device 100 or the battery pack 90 has been set. The device detection circuit 116 receives a device information signal which is sent from the mobile electronic device 100 or the battery pack 90, and thus detects that the mobile electronic device 100 or the battery pack 90 has been set. In a state where the mobile electronic device 100 or the battery pack 100 is not set, the high frequency power source 114 stops supplying the high frequency power to the primary coil 113. The battery charger 110 can also avoid unwanted consumption of the inputted power and also avoid an unwanted charge of the incorporated battery 112.

The high frequency power source 114 gets a supply of DC power from either of an AC adaptor (not shown), a USB cable 142, or the incorporated battery 112. The contactless battery charger 110 shown in FIG. 20 does not incorporate a commercial power supply circuit for converting a commercial power supply (AC 100 V in Japan) to the DC of source voltage of the high frequency power source 114. The contactless battery charger 110 which does not incorporate the commercial power supply circuit can make the external casing 111 thinner. This is because a power transformer is not incorporated which is needed for a commercial power supply circuit. In the contactless battery charger 110, the external casing 111 is provided with a DC inputting terminal 117 which is composed of a connection terminal 117A for the AC adaptor and a USB terminal 117B for connecting a USB cable 142. The connection terminal 117A and the USB terminal 117B are connected to the high frequency power source 114 to supply an inputted DC power to the high frequency power source 114.

The contactless battery charger 10, as shown in FIG. 17, connects a connection plug 141 to the connection terminal 117A of the AC adaptor, or connects a computer, etc. to the USB terminal 117B via the USB cable 142, so that the DC power is supplied to the high frequency power source 114. In a state where the DC power is supplied, when the mobile electronic device 100 or the battery pack 90 is set, the high frequency power source 114 supplies the high frequency power to the primary coil 113 to charge the battery pack 80, 90. At this state, the charging circuit 115 of the incorporated battery 112 is also in an operational state to charge the incorporated battery 112. However, when the incorporated battery 112 cannot be charged, with a shortage of current capacity of the computer which is connected to the AC adaptor or the USB terminal 117B, the inputted electric power is supplied to the high frequency power source 114 alone to charge the battery pack 80, 90 alone. After the battery pack 100 is fully charged, the inputted power is supplied to the charging circuit 115 to charge the incorporated battery 112. Further, in a state where the mobile electronic device 100 or the battery pack 90 is not set, when the incorporated battery 112 is not fully charged, the inputted power is supplied to the charging circuit 115 to charge the incorporated battery 112. When the incorporated battery 112 is fully charged, the charging circuit 115 stops charging the incorporated battery 112. The incorporated battery 112 is retained in a state of being fully charged as far as possible. Further, in a state where the DC power is inputted from the AC adaptor or the computer, it is also possible to supply the DC power to the high frequency power source 114 from the incorporated battery 112 as well. In this state, when the high frequency power is increased from the high frequency power source 114, the battery pack 80, 90 can be fully charged within a shorter period of time. However, when a residual capacity of the incorporated battery 112 is not sufficient, the supply of the DC power from the incorporated battery 112 to the high frequency power source 114 is stopped. The high frequency power source 114 detects a residual capacity of the incorporated battery 112, and when the residual capacity is detected to be larger than a predetermined capacity, the DC power is supplied from the incorporated battery 112 to the high frequency power source 114.

Figure 21:
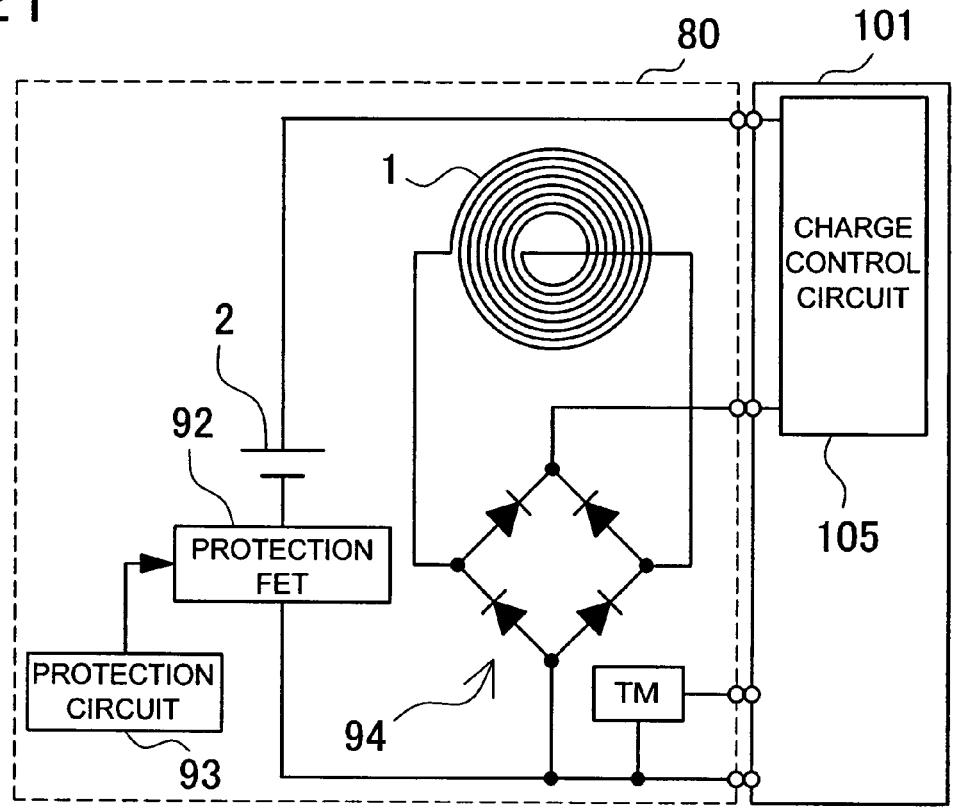
FIG. 21 is a circuit diagram showing an example of the battery pack incorporated in a mobile electronic device, as shown in FIG. 17.
Figure 22:
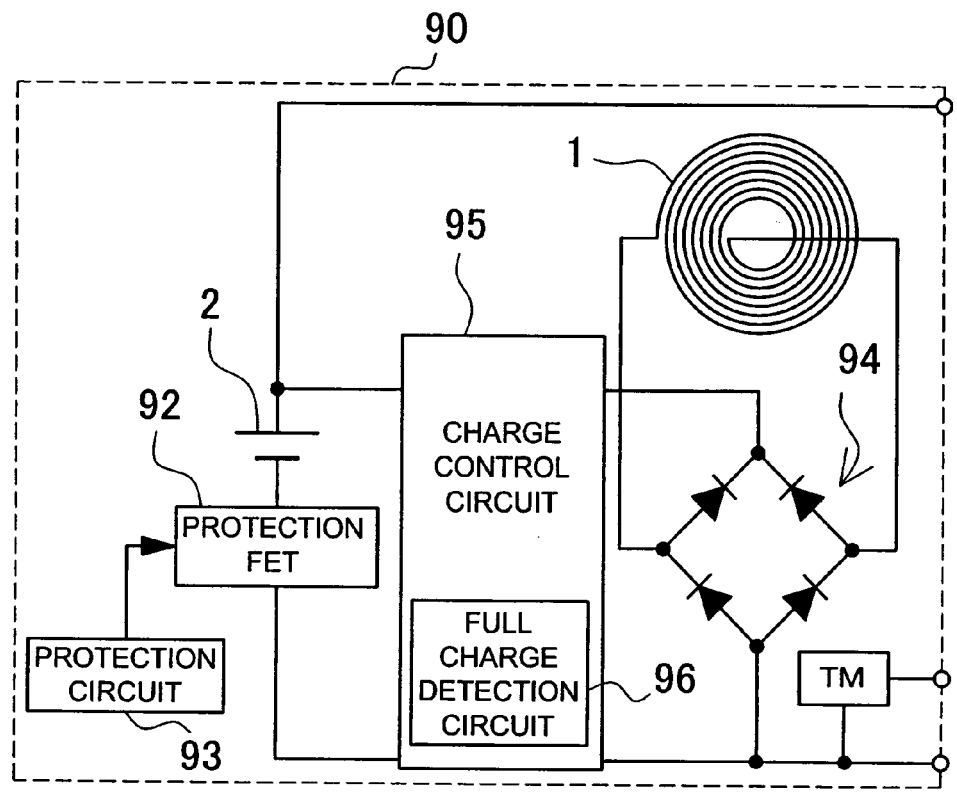
FIG. 22 is a circuit diagram showing an example of the battery pack, as shown in FIG. 18.

A circuit diagram of the battery pack 80, 90 is shown in FIGS. 21 and 22 respectively. The battery pack 80 shown in FIG. 21 includes a secondary battery 2, a secondary coil 1, and a rectifier circuit, composed of a diode bridge, for rectifying the high frequency power induced to the secondary coil 1. The battery pack 80 outputs the DC current outputted from the rectifier circuit 94, to the device-side circuit 101 in the mobile electronic device 100 with the battery pack 80 being implemented. Further, the illustrated battery pack 80 includes: a protection FET 92 connected in series with the secondary battery 2; and a protection circuit 93 controlling the protection FET 92 to be switched on or off to protect the secondary battery 2. The protection circuit 93 switches the protection FET 92 on or off to prevent the secondary battery 2 from an overcharge and an over-discharge. The mobile electronic device 100 mounted with the battery pack 80 incorporates a charge control circuit 105 of the secondary battery 2, in the device-side circuit 101. The charge control circuit 105 charges the secondary battery 2 by means of the DC power inputted from the rectifier circuit 94. The mobile electronic device 100 inputs the DC power, outputted from the rectifier circuit 94, to the charge control circuit 105 to charge the secondary battery 2, so that the DC power outputted from the rectifier circuit 94 can be efficiently used for charging the secondary battery 2. This is because the battery pack 80 does not have to incorporate a circuit for stabilizing a voltage which is susceptible to a power loss.

Further, the battery pack 90 shown in FIG. 22 incorporates a charge control circuit 95 for the secondary battery 2. The charge control circuit 95 fully charges the secondary battery 2 by using the DC power outputted from the rectifier circuit 94. In addition, the charge control circuit 95 is provided with a full charge detection circuit 96 for detecting a full charge state of the secondary battery 2. The full charge detection circuit 96, when the secondary battery 2 is fully charged, outputs a full charge signal. The full charge signal is outputted to the secondary coil 1, and transmitted from the secondary coil 1 to the primary coil 113. The battery charger 110 incorporates a charge stoppage circuit 129 for stopping a charge by detecting a full charge signal which is outputted from the full charge detection circuit 96. The battery charger 110 incorporate the charge stoppage circuit 129 in the high frequency power source 114. The charge stoppage circuit 129, when detecting a full charge signal transmitted from the full charge detection circuit 96 in the battery pack 90, stops the supply of the high frequency power to the primary coil 113. When the secondary battery 2 is fully charged, the battery pack 90 transmits a full charge signal to the battery charger 110. Accordingly, the battery charger 110, detecting the full charge signal transmitted from the battery pack 90, is able to stop the supply of the high frequency power to the primary coil 113. As such, when the battery pack 90 is fully charged, the power supply to the high frequency power source 114 is shut down to avoid unwanted power consumption. The illustrated battery pack is able to charge the secondary battery 2 being set to the battery charger, without implementing to a mobile electronic device such as a cellular phone.

For further information, although not shown, the circuit in FIG. 22 may serve as a circuit including the following procedures for identification. In the circuit, an ID signal (an identification signal) is sent from the primary coil 113; the ID signal being electromagnetically induced is received at the secondary coil 1; and the ID signal is checked and authenticated on the side of the battery pack 90 or the mobile electronic device 100. Thus, when the ID signal can be checked and authenticated, the charge is started, and when not checked and authenticated, the charge is stopped. For further information, when the ID signal can be checked and authenticated by the battery pack 90 or the mobile electronic device 100, a signal (=ID check signal) indicative of having been able to check the ID signal is sent from the battery pack 90 or the mobile electronic device 100 to the primary coil 113 via the secondary coil 1, so that the ID check signal is received at the battery charger 110 including the primary coil 113, and thus a power supply is continued. And, when ID check signal cannot be received, the battery pack or the mobile electronic device is identified to be incompatible with the battery charger 110, and the power supply is stopped.

It should be apparent to those with an ordinary skill in the art that while various preferred embodiments of the invention have been shown and described, it is contemplated that the invention is not limited to the particular embodiments disclosed, which are deemed to be merely illustrative of the inventive concepts and should not be interpreted as limiting the scope of the invention, and which are suitable for all modifications and changes falling within the scope of the invention as defined in the appended claims.

The present application is based on Application No. 2006-243331 filed in Japan on Sep. 7, 2006, the content of which is incorporated herein by reference.

What is claimed is:

1. A battery pack rechargeable by a magnetic induction effect, the battery pack comprising:
    a secondary coil to be electromagnetically coupled to a primary coil incorporated in a battery charger;
    a secondary battery rechargeable by electric power induced to the secondary coil; and
    a spacer for covering a surface of the secondary battery, the spacer being made of a non-magnetic material,
    wherein the secondary battery is in a form of a thin battery having a larger width than a thickness, and two opposing surfaces composed of a first flat surface and a second flat surface in the thickness direction of the battery,
    wherein the secondary coil is in a form of a planar coil layered above the first flat surface of the thin battery,
    wherein the spacer is layered above the first flat surface of the thin battery, and the spacer is formed in a flat form and defines a positioning area, the positioning area being formed as a fitting-in recess in the spacer or as a hole in the spacer,
    wherein the secondary coil is positioned in the positioning area of the spacer to be surrounded by a peripheral area of the spacer, the peripheral area of the spacer including a top surface and a bottom surface, the bottom surface facing the first flat surface of the thin battery, and
    wherein an exterior side surface of the secondary coil is flush or coplanar with the top surface of the peripheral area of the spacer.

2. The battery pack rechargeable by a magnetic induction effect as recited in claim 1, wherein a wire material for the secondary coil is in a spirally coiled form of a planar coil with a plurality of insulated metallic wires being placed in parallel with respect to the first flat surface, a surface of each wire being insulated with an insulating coating, and wherein the parallel plurality of metallic wires spirally coiled are disposed in an electrically parallel connection.

3. The battery pack rechargeable by a magnetic induction effect as recited in claim 1, wherein a wire material for the secondary coil is composed of at least an insulated metallic wire, a surface of which is insulated with an insulation coating, wherein the insulated metallic wire, in its cross section, has a larger width being parallel with respect to the first flat surface of the thin battery than a thickness being orthogonal to the first flat surface.

4. The battery pack rechargeable by a magnetic induction effect as recited in claim 1,
    wherein a wire material for the secondary coil is composed of at least an insulated metallic wire, a surface of which is insulated with an insulation coating, and
    wherein the insulated metallic wire for the secondary coil is rectangular in a cross section of the wire.

5. The battery pack rechargeable by a magnetic induction effect as recited in claim 1, wherein the secondary coil is in a form of planar coil with a wire material for the secondary coil being spirally coiled on a planar surface, and is integrated by using an adhesive material or a painting material.

6. The battery pack rechargeable by a magnetic induction effect as recited in claim 1, wherein the secondary coil is in a plurality of tiers of flatly coiled wire materials.

7. The battery pack rechargeable by a magnetic induction effect as recited in claim 1, further comprising an electromagnetic shield coating which is capable of magnetically shielding a magnetic flux line,
    wherein the electromagnetic shield coating is provided between the secondary coil and the first flat surface of the thin battery.

8. The battery pack rechargeable by a magnetic induction effect as recited in claim 7, wherein the electromagnetic shield coating is fixed to the first flat surface of the thin battery by means of an adhesive layer.

9. The battery pack rechargeable by a magnetic induction effect as recited in claim 7, wherein the electromagnetic shield coating is in a sheet form of amorphous metal.

10. The battery pack rechargeable by a magnetic induction effect as recited in claim 7, wherein the secondary coil is fixed to the first flat surface of the thin battery via the electromagnetic shield coating.

11. The battery pack rechargeable by a magnetic induction effect as recited in claim 1, further comprising a rectangular frame casing for covering a periphery of the thin battery, a circuit board disposed between the frame casing and the thin battery, and a circuit board holder for placing the circuit board in position,
    wherein the spacer covers the first flat surface of the thin battery.

12. The battery pack rechargeable by a magnetic induction effect as recited in claim 11, wherein the frame casing is disposed outside the thin battery, the circuit board is placed in position between the frame casing and the thin battery by means of the circuit board holder, wherein a battery assembly is composed of the thin battery and the spacer which is layered above the first flat surface of the thin battery, and wherein an exterior side surface of the battery assembly is covered by a plastic film.

13. The battery pack rechargeable by a magnetic induction effect as recited in claim 11, wherein the fitting-in recess is provided with a lower step portion for disposing a central outgoing wire to be drawn out of a center portion of the secondary coil.

14. The battery pack rechargeable by a magnetic induction effect as recited in claim 11, wherein the circuit board holder is integrally formed with the spacer for covering the first flat surface of the thin battery.

15. The battery pack rechargeable by a magnetic induction effect as recited in claim 1, wherein the thin battery is a lithium-ion battery.

16. The battery pack rechargeable by a magnetic induction effect as recited in claim 1, wherein the thin battery is a lithium polymer battery.

17. The battery pack rechargeable by a magnetic induction effect as recited in claim 1, wherein the secondary coil is fixed in position by the spacer.

* * * * *